(12) United States Patent
Nakajima et al.

(10) Patent No.: US 6,629,544 B2
(45) Date of Patent: Oct. 7, 2003

(54) GAS PRESSURE-REDUCING VALVE

(75) Inventors: Youji Nakajima, Miyagi (JP); Kazuki Ishikawa, Miyagi (JP); Yoshio Saito, Miyagi (JP)

(73) Assignee: Keihin Corporation, Tokyo (JP)

( * ) Notice: Subject to any disclaimer, the term of this patent is extended or adjusted under 35 U.S.C. 154(b) by 87 days.

(21) Appl. No.: 10/005,348

(22) Filed: Dec. 7, 2001

(65) Prior Publication Data

US 2002/0083980 A1 Jul. 4, 2002

(30) Foreign Application Priority Data

| Dec. 11, 2000 | (JP) | 2000-376341 |
| Dec. 11, 2000 | (JP) | 2000-376342 |
| Dec. 11, 2000 | (JP) | 2000-376344 |
| Dec. 11, 2000 | (JP) | 2000-376345 |

(51) Int. Cl.$^7$ .............................................. G05D 16/02
(52) U.S. Cl. ............. 137/505; 137/505.18; 137/505.36; 251/64
(58) Field of Search ............................ 137/505, 505.18, 137/505.36; 251/64

(56) References Cited

U.S. PATENT DOCUMENTS

| 4,909,278 A | * | 3/1990 | Ray | 137/505.12 |
| 5,285,810 A | * | 2/1994 | Gotthelf | 137/505.18 |
| 5,538,332 A | * | 7/1996 | Carroll | 251/64 |
| 5,755,254 A | * | 5/1998 | Carter et al. | 137/505 |

* cited by examiner

Primary Examiner—Stephen M. Hepperle
(74) Attorney, Agent, or Firm—Arent Fox Kintner Plotkin & Kahn, PLLC

(57) ABSTRACT

A gas pressure-reducing valve includes a pressure-reducing chamber for generating a gas pressure that acts on one surface of a diaphragm, a valve body that can sit on a valve seat having in its central part a valve hole communicating with the pressure-reducing chamber, and a spring biasing the diaphragm in a direction that detaches the valve body from the valve seat. A valve housing is formed by conjoining a body, a partition, and a cover. The partition forms the pressure-reducing chamber between itself and the body and forms a pressure action chamber between itself and the diaphragm. The cover forms the spring chamber between itself and the other surface of the diaphragm and has the peripheral edge of the diaphragm clamped between itself and the partition. The partition has a through hole for allowing the valve stem to run through in an airtight and axially slidable manner and a communicating hole for providing communication between the pressure action chamber and the pressure-reducing chamber. The structure of the body can thus be simplified thereby enhancing the machining precision, and the diameter of the pressure-reducing chamber can be determined regardless of the diameter of the diaphragm.

7 Claims, 20 Drawing Sheets

GAS PRESSURE-REDUCING VALVE

BACKGROUND OF THE INVENTION

1. Field of the Invention

The present invention relates to a gas pressure-reducing valve. In particular, it relates to an improvement of a gas pressure-reducing valve, wherein a pressure-reducing chamber for generating a gas pressure that acts on one surface of a diaphragm is formed within a valve housing that clamps the peripheral edge of the diaphragm, a valve body that can sit on a valve seat having in its central part a valve hole communicating with the pressure-reducing chamber is fixed to one end of a valve stem penetrating the valve hole in an axially movable manner, the other end thereof being connected to the central part of the diaphragm, and a spring biasing the diaphragm in a direction that detaches the valve body from the valve seat is housed in a spring chamber formed within the valve housing, the spring chamber facing the other surface of the diaphragm.

2. Description of the Related Art

Conventionally, such a gas pressure-reducing valve is already known in, for example, Japanese Patent Application Laid-open No. 11-270718, wherein a valve housing is formed from a body and a cover fastened to the body, and the peripheral edge of a diaphragm is clamped between the body and the cover.

In the above-mentioned conventional arrangement, since a pressure-reducing chamber is formed between one surface of the diaphragm and the body, the body structure surrounding the pressure-reducing chamber becomes complicated, thereby raising the possibility that the machining precision might be degraded. Furthermore, when the diameter of the diaphragm is made small in order to satisfy a need for reducing the dimensions of the gas pressure-reducing valve, it becomes necessary to make small the diameter of the pressure-reducing chamber facing said one surface of the diaphragm, thereby changing the flow characteristics of the gas pressure-reducing valve and bringing about a situation where the gas pressure of the pressure-reducing chamber might fall below the target control pressure by a large amount.

SUMMARY OF THE INVENTION

The present invention has been carried out in view of the above-mentioned circumstances, and it is an object of the present invention to provide a gas pressure-reducing valve that can enhance the machining precision by simplifying the body structure and determine the diameter of the pressure-reducing chamber regardless of the diameter of the diaphragm.

In order to accomplish the above-mentioned object, in accordance with a first aspect of the present invention, there is proposed a gas pressure-reducing valve that includes a pressure-reducing chamber for generating a gas pressure that acts on one surface of a diaphragm; the pressure-reducing chamber being formed within a valve housing that clamps the peripheral edge of the diaphragm; a valve body that can sit on a valve seat having in its central part a valve hole communicating with the pressure-reducing chamber; a valve stem penetrating the valve hole in an axially movable manner wherein one end of the valve stem is connected to the central part of the diaphragm and the other end of the valve stem is fixed to the valve body; and a spring biasing the diaphragm in a direction that detaches the valve body from the valve seat, the spring being housed in a spring chamber formed within the valve housing and the spring chamber facing the other surface of the diaphragm. In this gas pressure-reducing valve, the valve housing is formed by conjoining a body, a partition, and a cover, the body being provided with the valve seat, the partition forming the pressure-reducing chamber between itself and the body and forming a pressure action chamber between itself and one surface of the diaphragm, and the cover forming the spring chamber between itself and the other surface of the diaphragm and clamping the peripheral edge of the diaphragm between itself and the partition, and wherein the partition includes a through hole for allowing the valve stem to run through in an airtight and axially slidable manner and a communicating hole for providing communication between the pressure action chamber and the pressure-reducing chamber.

In accordance with the above-mentioned arrangement of the first aspect, the peripheral edge of the diaphragm is clamped between the cover and the partition interposed between the cover and the body, the pressure-reducing chamber is formed between the partition and the body, and the pressure action chamber that communicates with the pressure-reducing chamber is formed between one surface of the diaphragm and the partition. It is therefore possible to simplify the structure of parts of the body facing the pressure-reducing chamber thereby enhancing the precision with which the body is machined and enabling the partition to be machined easily in a state where it is separated from the body. Furthermore, although the diameter of the pressure action chamber changes in accordance with changes in the diameter of the diaphragm, the diameter of the pressure-reducing chamber which is separated from the pressure action chamber by the partition can be determined independently of a change in the diameter of the diaphragm. Even when the diameter of the diaphragm is made small in order to satisfy a need for reducing the dimensions of the gas pressure-reducing valve, it is unnecessary to decrease the diameter of the pressure-reducing chamber, thereby avoiding the occurrence of any change in the flow characteristics that would cause the gas pressure of the pressure-reducing chamber to fall below the target control pressure by a large amount. Moreover, since the gas pressure of the pressure-reducing chamber does not directly act on said one surface of the diaphragm, it is possible to prevent an excessive load from being imposed on the diaphragm when the gas pressure of the pressure-reducing chamber changes greatly, thereby protecting the diaphragm.

Furthermore, in accordance with a second aspect of the present invention, in addition to the above-mentioned first aspect, there is proposed a gas pressure-reducing valve wherein the body has a slide bore so that the valve body is slidably fitted in the slide bore. In accordance with the above-mentioned arrangement, the axial movements of the valve body and the valve stem are supported at two points; on the inner face of the slide bore of the body; and on the inner face of the through hole provided on the partition, thereby preventing the valve body and the valve stem from tilting and ensuring reliable opening and closing operations of the valve body.

Furthermore, in accordance with a third aspect of the present invention, in addition to the above-mentioned arrangement of the first aspect, there is proposed a gas pressure-reducing valve wherein the diaphragm, the valve stem and the valve body are assembled to the valve housing so that, when the diaphragm is in its natural state without any external force acting on it, the valve body is detached from the valve seat.

In accordance with the above-mentioned arrangement of the third aspect, when the diaphragm is assembled to the valve housing in its natural state without any external force acting on it, the valve body is detached from the valve seat, and when the diaphragm bends so as to seat the valve body on the valve seat in response to the action of the gas pressure of the pressure-reducing chamber, the diaphragm bends toward the spring chamber side so as to be in a state in which the diaphragm exerts a resilient force in the same direction as the direction of the spring force, that is to say, opposite to the direction in which the gas pressure of the pressure-reducing chamber closes the valve. When the valve body is detached from the valve seat to a great extent so as to increase the gas flow, the resilient force exerted by the diaphragm against the force of the gas pressure of the pressure-reducing chamber in the direction which closes the valve becomes small. It is thereby possible to minimize any adverse effect on the responsiveness resulting from the resilient force exerted by the diaphragm, and even when the gas flow increases, the pressure of the pressure-reducing chamber is not controlled at a lower value.

Furthermore, in accordance with a fourth aspect of the present invention, in addition to the arrangement of the third aspect, there is proposed a gas pressure-reducing valve wherein the diaphragm is formed integrally from a ring-shaped outer peripheral seal part clamped by the valve housing, a valve stem connecting part connected to one end of the valve stem, and a flexural part having a transverse cross section that protrudes toward the spring chamber side and disposed inward relative to the outer peripheral seal part so that, when the diaphragm is in its natural state, the inner periphery of the flexural part is offset toward the pressure-reducing chamber side by a predetermined amount relative to the outer periphery of the flexural part.

In accordance with the arrangement of the fourth aspect, when the diaphragm, in its natural state, is assembled to the valve housing, the inner periphery of the flexural part of the diaphragm, that is to say, the central part to which the valve body is connected via the valve stem is offset toward the pressure-reducing chamber side relative to the outer periphery of the flexural part. It is easy to achieve a state in which, when the diaphragm in its natural state is assembled to the valve housing, the valve body is detached from the valve seat, thereby making assembly of the diaphragm easy.

Furthermore, in accordance with a fifth aspect of the present invention, in addition to the arrangement of the first aspect, there is proposed a gas pressure-reducing valve further including a leaf spring that is in frictional contact with the inner face of a cylindrical part forming a part of the valve housing thereby applying a sliding resistance to the diaphragm, wherein the leaf spring is formed from a bottomed cylindrical cup and a plurality of leaves connected integrally with the open end of the cup so as to be in resilient sliding contact with a plurality of points spaced at equal intervals in the circumferential direction on the cylindrical part, the closed end of the cup being interposed between the spring housed in the spring chamber in a coiled form and a retainer mounted on the central part of the diaphragm on the spring chamber side, and the spring chamber being formed in the cylindrical part.

In accordance with the arrangement of the fifth aspect, the leaf spring applies sliding resistance to the diaphragm against the self-induced vibration of the coil spring as a result of the plurality of leaves of the leaf spring making resilient sliding contact with the inner face of the cylindrical part, which is a part of the valve housing. Even when the diameter of the cylindrical part decreases as the diameter of the diaphragm decreases, the contact areas between the leaf spring and the cylindrical part do not change. The level of sliding resistance therefore does not increase as the dimensions of the gas pressure-reducing valve reduce. Furthermore, the level of sliding resistance due to the resilient sliding contact between the leaf spring and the cylindrical part does not change as the temperature changes. It is therefore possible to apply a stable sliding resistance against the self-induced vibration of the coil spring regardless of a reduction in the dimensions of the diaphragm and a change in the temperature, thereby preventing any degradation in the responsiveness of the gas pressure-reducing valve. Moreover, since the plurality of leaves are supported by the cup having a comparatively high rigidity, when assembling the leaf spring to the valve housing, breakage, etc. of the leaves can be avoided, thereby enhancing the ease of assembly.

Furthermore, in accordance with a sixth aspect of the present invention, in addition to the arrangement of the first aspect, there is proposed a gas pressure-reducing valve wherein the spring chamber housing the spring in a coiled form is formed within a cylindrical part forming a part of the valve housing, the cylindrical part being provided with an end wall on the side opposite the diaphragm; an adjustment screw is screwed into a support tube arranged coaxially within the cylindrical part and connected to the end wall, the adjustment screw in accordance with its axial position adjusting the spring load of the spring; the support tube is provided coaxially with a small diameter hole on the axially inner side and a large diameter hole on the axially outer side, a female thread being cut into at least one part of the large diameter hole; the adjustment screw is formed by coaxially connecting a small diameter shaft part and a large diameter shaft part, the small diameter shaft part being fitted in the small diameter hole and having mounted on its outer face an annular seal that makes resilient contact with the inner face of the small diameter hole, the large diameter shaft part having on its outer periphery a male thread mating with the female thread and on its outer end an engagement recess that can engage with a rotating tool, and the axial position of the adjustment screw being set so that the outer end of the large diameter shaft part is positioned inward relative to the outer face of the end wall; and a recess is formed in the outer end part of the large diameter hole employing the outer end of the large diameter shaft part as a closed end of the recess, the recess being filled with a filler that can be solidified.

In accordance with the arrangement of the sixth aspect, merely adjusting the axial position of the adjustment screw by screwing it into the support tube can adjust the spring load of the coil-form spring, thereby reducing the number of components as well as the number of assembly steps. The support tube is provided coaxially with the small diameter hole on the inward side and the large diameter hole on the outward side. The adjustment screw is fitted into the small diameter hole and has on its forward end the small diameter shaft part having mounted on its outer face the annular seal in resilient contact with the inner face of the small diameter hole. It is therefore possible to minimize any damage to the seal caused by the female screw provided on the inner face of the large diameter hole when the adjustment screw is inserted into the support tube. Since the adjustment screw is screwed into the support tube until the outer end of the adjustment screw reaches a position that is inward relative to the outer face of the end wall, the adjustment screw does not project out of the outer face of the end wall, thereby contributing to a reduction in the dimensions of the gas pressure-reducing valve. Furthermore, since the recess is formed in the outer end part of the large diameter hole, the recess employing the outer end of the large diameter shaft part of the adjustment screw as its closed end, and the recess is filled with the filler, solidifying the filler can gain the effects of preventing the adjustment screw from rotating and of preventing erroneous operation while at the same time requiring neither a lock nut nor a cap. In particular, the filler entering the engagement recess in the outer end part of the adjustment screw can yet more reliably prevent the adjustment screw from rotating.

Furthermore, in accordance with a seventh aspect of the present invention, in addition to the arrangement of the sixth aspect, there is proposed a gas pressure-reducing valve wherein the female thread is cut into the large diameter hole, one part of the female thread facing the recess. In accordance with the above-mentioned arrangement, since the filler enters the threads of the female thread, the filler can be reliably retained within the recess and can also efficiently penetrate into the part where the male thread of the adjustment screw and the female thread of the large diameter hole are screwed together, thereby yet more reliably stopping the adjustment screw from rotating.

The above-mentioned object, other objects, characteristics and advantages of the present invention will become apparent from explanations of preferred embodiments that will be described in detail below by reference to the appended drawings.

BRIEF DESCRIPTION OF THE DRAWINGS

FIG. 1 is a schematic diagram showing the arrangement of a gaseous fuel supply system.

FIG. 2 is a plan view showing a state in which the gaseous fuel supply system is mounted on a vehicle.

FIG. 3 is a side view of a regulator.

FIG. 4 is a top view of the regulator from arrow 4 in FIG. 3.

FIG. 5 is a bottom view of the regulator from arrow 5 in FIG. 3.

FIG. 6 is a cross section at line 6—6 in FIG. 4.

FIG. 7 is a cross section at line 7—7 in FIG. 3.

FIG. 8 is a magnified longitudinal section of a solenoid cut-off valve.

FIG. 9 is a magnified longitudinal section of a primary pressure-reducing valve.

FIG. 10 is a top view of a leaf spring provided in the primary pressure-reducing valve.

FIG. 11 is a cross section at line 11—11 in FIG. 10.

FIG. 12 is a side view of a secondary pressure-reducing valve from arrow 12 in FIG. 13.

FIG. 13 is a view from arrow 13 in FIG. 12.

FIG. 14 is a view from arrow 14 in FIG. 13.

FIG. 15 is a cross section at line 15—15 in FIG. 14.

FIG. 16 is a cross section at line 16—16 in FIG. 13.

FIG. 17 is a magnified view of an essential part in FIG. 16.

FIG. 18 is a top view of a partition provided in the secondary pressure-reducing valve.

FIG. 19 is a cross section at line 19—19 in FIG. 18.

FIG. 20 is a magnified longitudinal section of a diaphragm provided in the secondary pressure-reducing valve.

FIG. 21 is a top view of a leaf spring provided in the secondary pressure-reducing valve.

FIG. 22 is a cross section at line 22—22 in FIG. 21.

FIG. 23 is a cross section corresponding to FIG. 6 of the second embodiment.

FIG. 24 is a cross section corresponding to FIG. 23 in a state with an alternative body.

DESCRIPTION OF PREFERRED EMBODIMENTS

Figure 1:
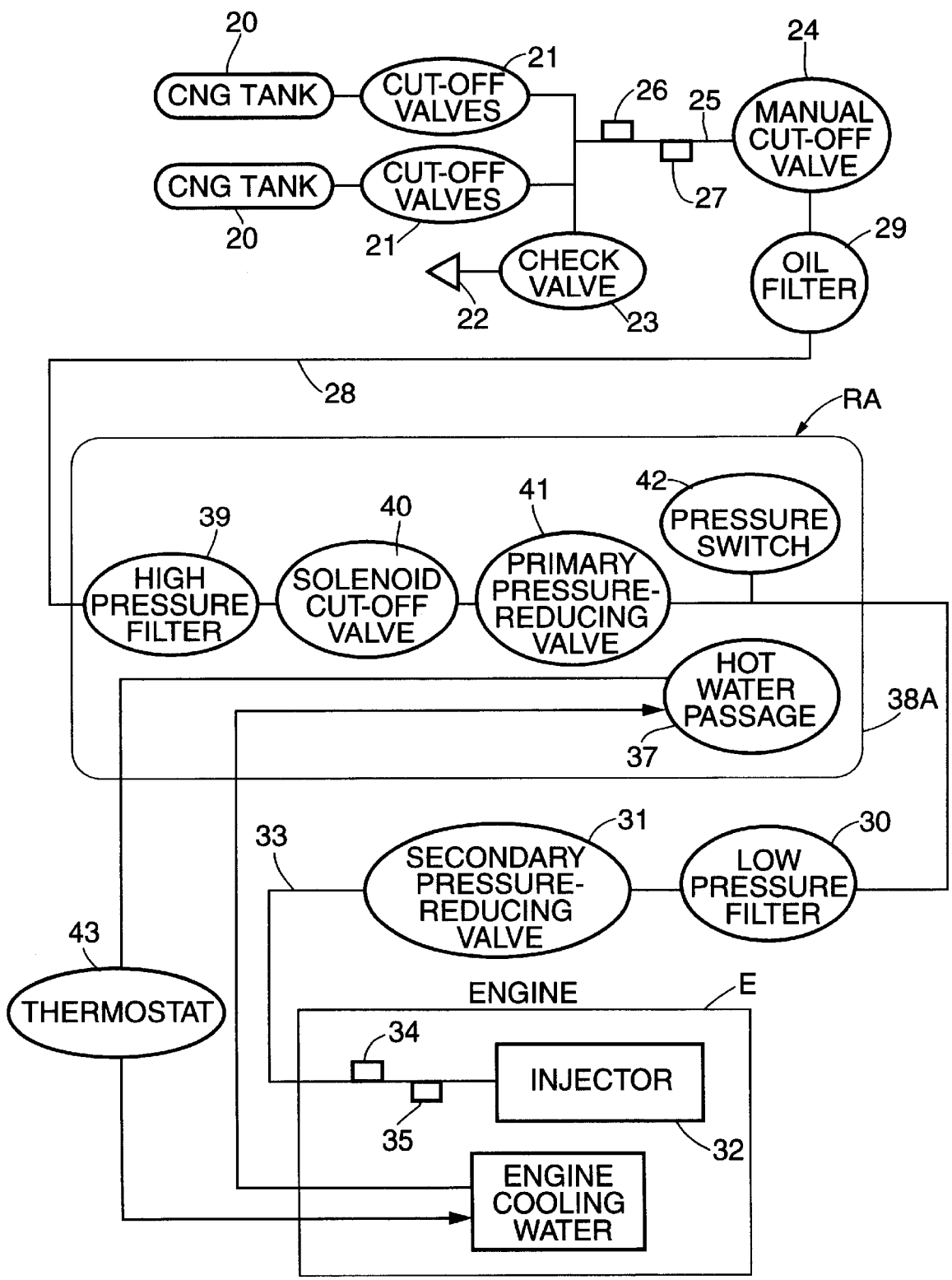
FIGS. 1 to 22 illustrate a first embodiment of the present invention.

The first embodiment of the present invention is explained below by reference to FIGS. 1 to 22. Referring to FIG. 1, compressed natural gas (hereinafter called CNG), which is a gaseous fuel, is stored in one or a plurality of CNG tanks 20 at high pressure, for example, 25 to 1 MPa. The CNG tanks 20 are equipped with corresponding container cut-off valves 21 that are connected in common both to a filling inlet 22 via a check valve 23, and to a manual cut-off valve 24. A pressure sensor 26 and a temperature sensor 27 are attached to a pipeline 25 between the container cut-off valves 21 and the manual cut-off valve 24.

When the container cut-off valves 21 and the manual cut-off valve 24 are open, CNG from the CNG tanks 20 is guided to a regulator RA via a high pressure pipeline 28 equipped with an oil filter 29 for removing oil that might have contaminated the CNG when the CNG tanks 20 were filled with CNG by a compressor. The pressure of the CNG is reduced to, for example, 0.6 to 0.7 MPa in the regulator RA, and the CNG is then guided to a secondary pressure-reducing valve 31 via a low pressure filter 30. The pressure of the CNG is reduced to, for example, 0.2 to 0.3 MPa in the secondary pressure-reducing valve 31, and the CNG is then guided to an injector 32 of an engine E via a pipeline 33 provided with a temperature sensor 34 and a pressure sensor 35.

Figure 2:
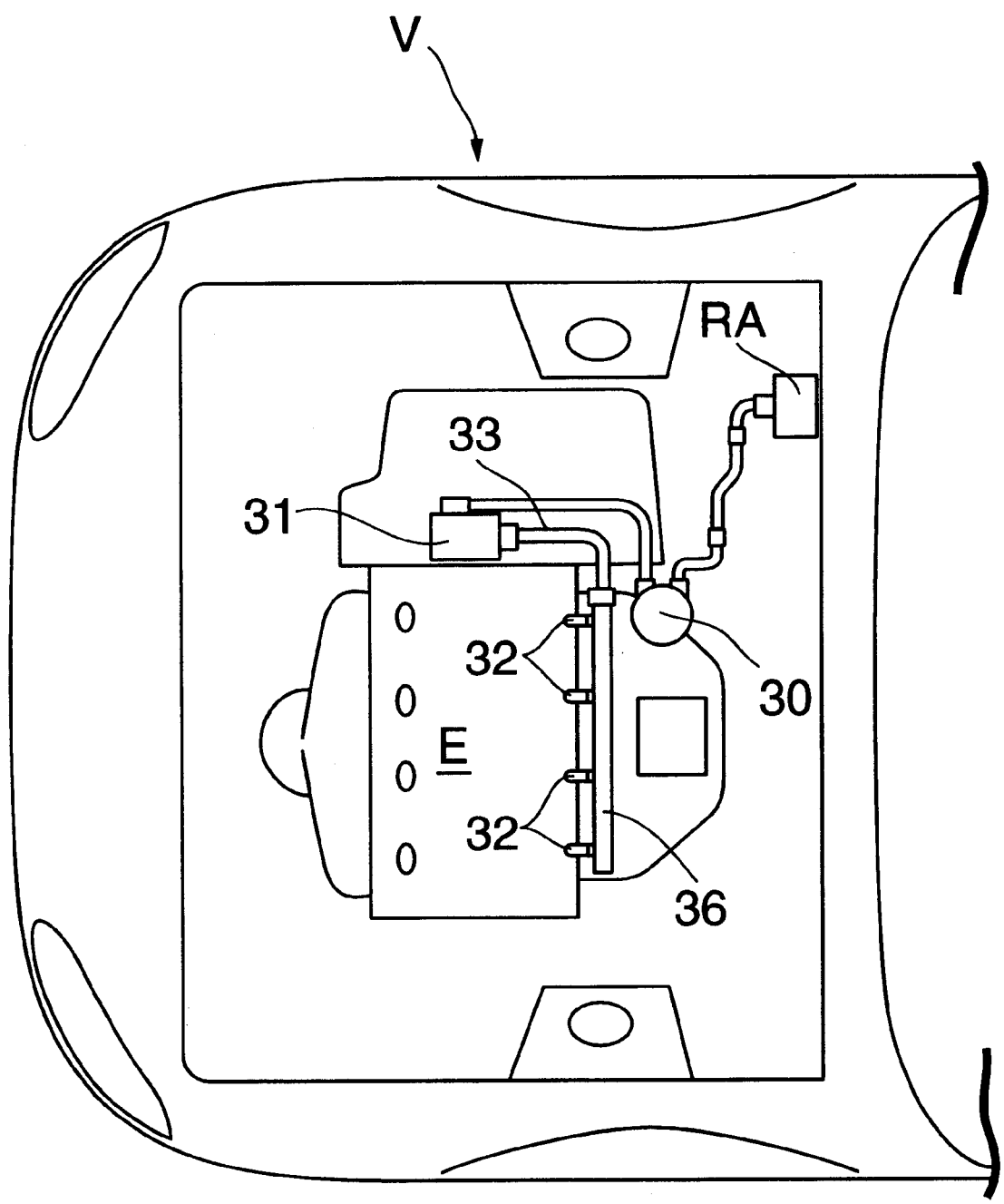
Figure 3:
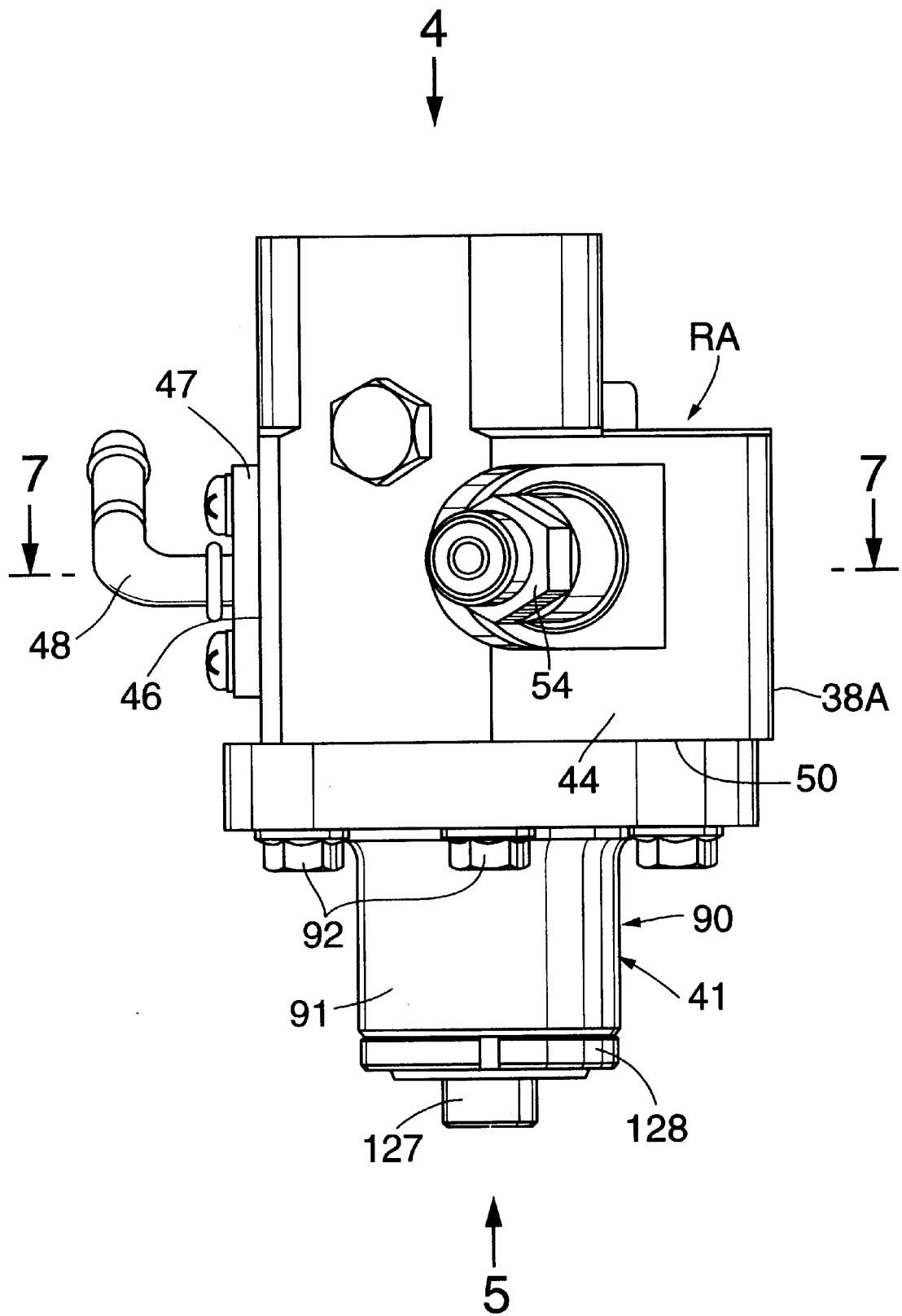
Figure 4:
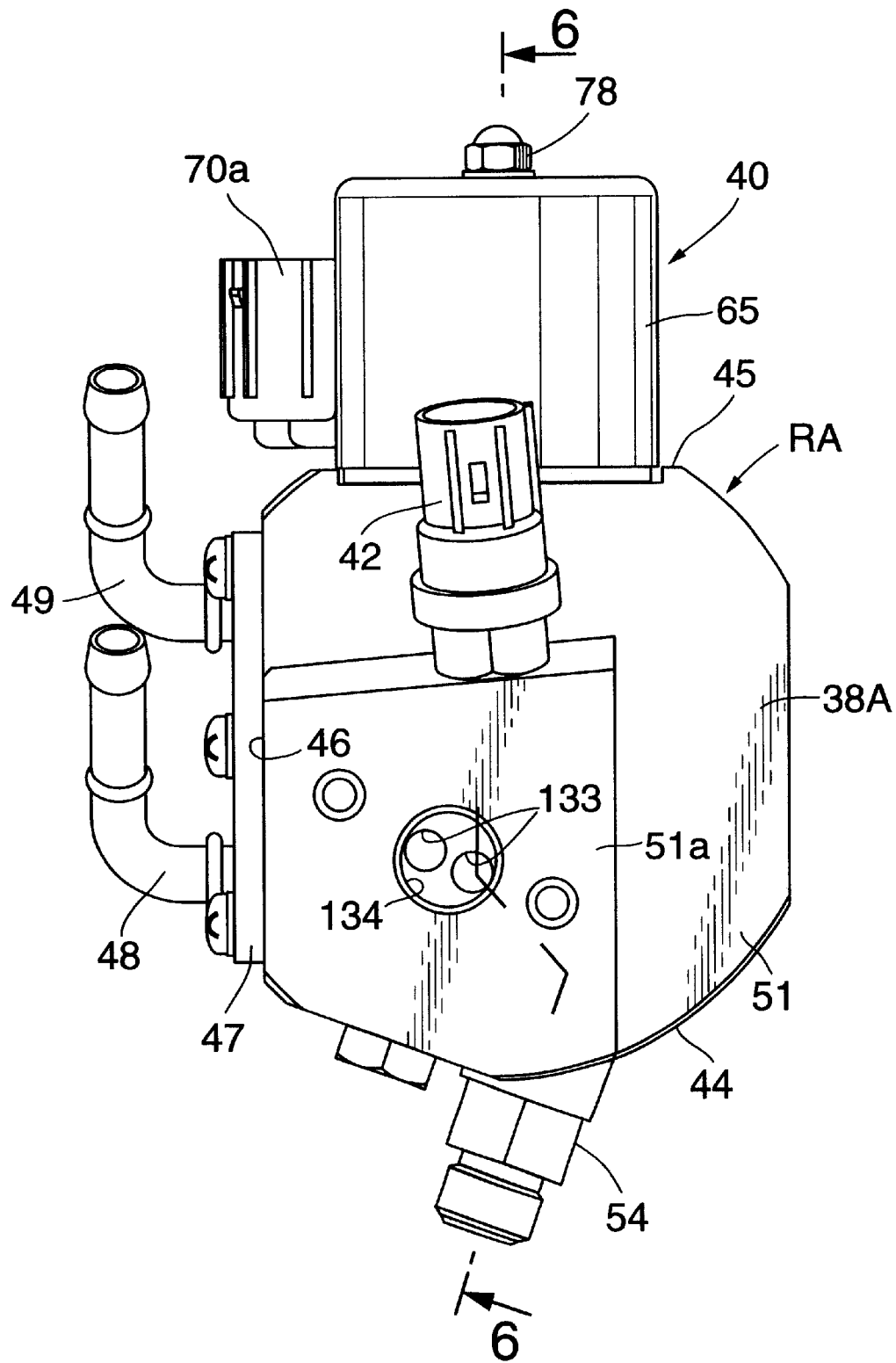
Figure 5:
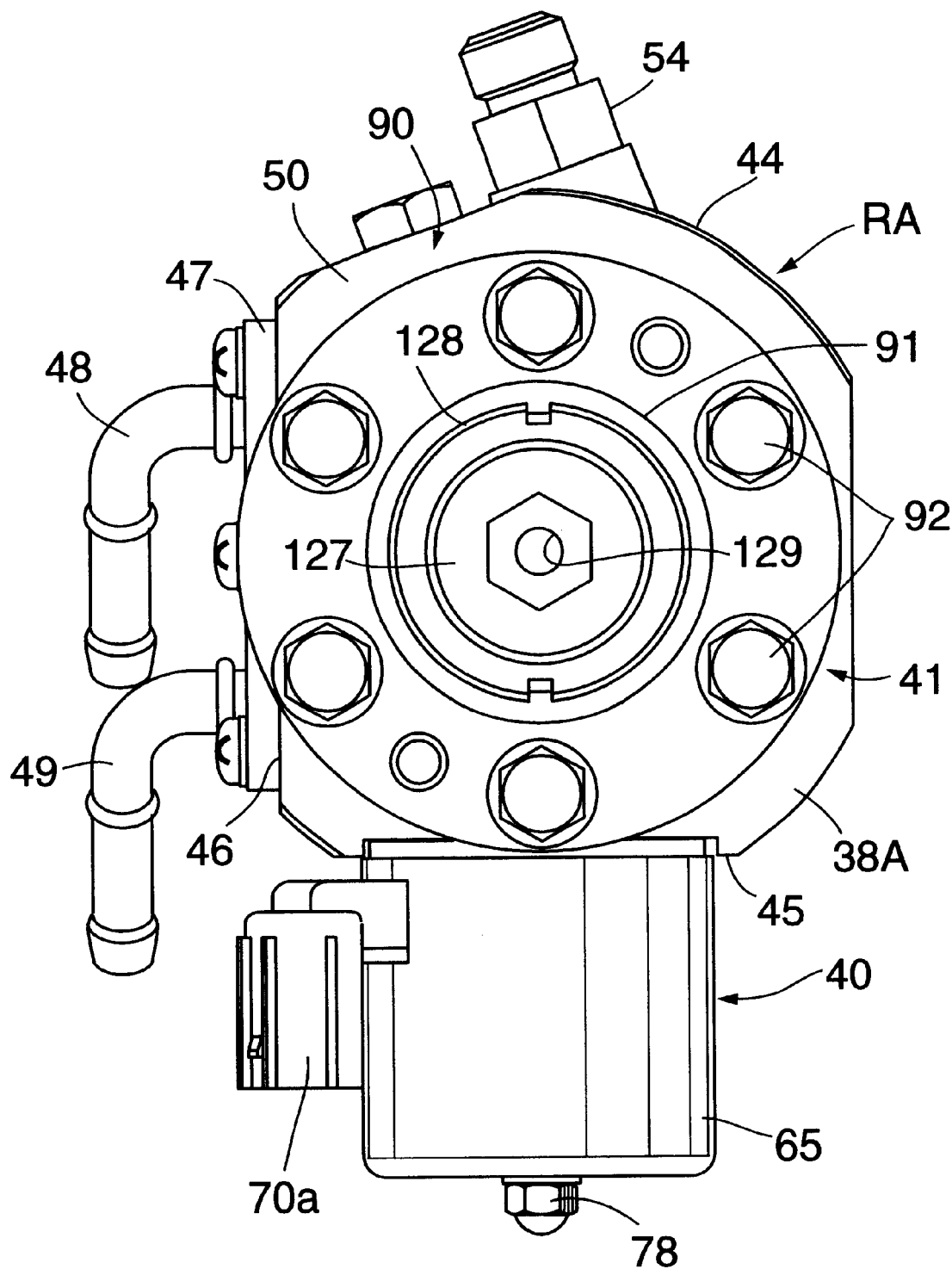

In FIG. 2, within the engine compartment of a vehicle V, the engine E, which is a multicylinder engine, has a plurality of injectors 32, which are connected in common to a gaseous fuel pipeline 36. The secondary pressure-reducing valve 31 placed in the vicinity of the engine E is connected to the gaseous fuel pipeline 36 via the pipeline 33. The low pressure filter 30 connected to the secondary pressure-reducing valve 31 is also placed in the vicinity of the engine E. In order to minimize the length of the high pressure pipeline 28, which guides the CNG from the CNG tanks 20 mounted on a rear part of the vehicle V, the regulator RA is separated from the engine E and placed in a rear part of the engine compartment.

The regulator RA is formed by providing a high pressure filter 39, a solenoid cut-off valve 40, and a primary pressure-reducing valve 41 on a common regulator body 38A having a hot water passage 37. The regulator RA is also provided with a pressure switch 42 as safety means.

The high pressure filter 39 removes impurities present in the CNG guided from the manual cut-off valve 24 via the high pressure pipeline 28. The primary pressure-reducing valve 41 operates so as to reduce to, for example, 0.6 to 0.7 MPa the pressure of the CNG at a high pressure of 25 to 1 MPa that has passed through the high pressure filter 39 to remove impurities. The solenoid cut-off valve 40 is provided between the high pressure filter 39 and the primary pressure-reducing valve 41 and closes when the engine E stops operating or in response to a signal output from the pressure switch 42. Furthermore, the pressure switch 42 changes its switching mode, for example, when the pressure of the CNG whose pressure has been reduced by the primary pressure-reducing valve 41 becomes equal to or exceeds a predetermined set pressure, for example, 1.65 MPa, and outputs a signal to close the solenoid cut-off valve 40.

Engine cooling water is introduced from the engine E to the hot water passage 37 of the regulator body 38A so that the temperature of the regulator body 38A does not drop excessively due to the reduction in pressure in the primary pressure-reducing valve 41. In addition, a thermostat 43 positioned separately from the regulator body 38A controls the temperature of the regulator body 38A and prevents it from rising excessively by closing a valve when the temperature of the engine cooling water circulating in the hot water passage 37 exceeds, for example, 70° C.

Referring to FIGS. 3 to 7 together, the regulator body 38A is formed so as to have a transverse cross section with a substantially rectangular shape. The high pressure filter 39 is mounted on the regulator body 38A from, among its outer side faces, a first side face 44 side, the first side face 44 being formed so as to protrude outward slightly. The solenoid cut-off valve 40 is mounted on the regulator body 38A on a second side face 45 that is opposite the first side face 44. A recess is provided on a third side face 46 among the outer side faces of the regulator body 38A, the third side face 46 providing a connection between the first and second side faces 44 and 45. The recess is used as the hot water passage 37. A cover plate 47 is fastened to the third side face 46 so as to cover the recess and is fitted with a pair of connecting pipes 48 and 49 for supplying the engine cooling water to and discharging it from the hot water passage 37.

The regulator body 38A has a first end face 50 and a second end face 51 that is opposite the first end face 50, the end faces being perpendicular to the first to third side faces 44 to 46. The primary pressure-reducing valve 41 is mounted on the regulator body 38A on the first end face 50 side. The pressure switch 42 is mounted on a projection 51a provided on the regulator body 38A so as to project out of the second end face 51.

The arrangements of the high pressure filter 39, the solenoid cut-off valve 40 and the primary pressure-reducing valve 41 forming the regulator RA are explained below in order.

(High Pressure Filter 39)

Figure 7:
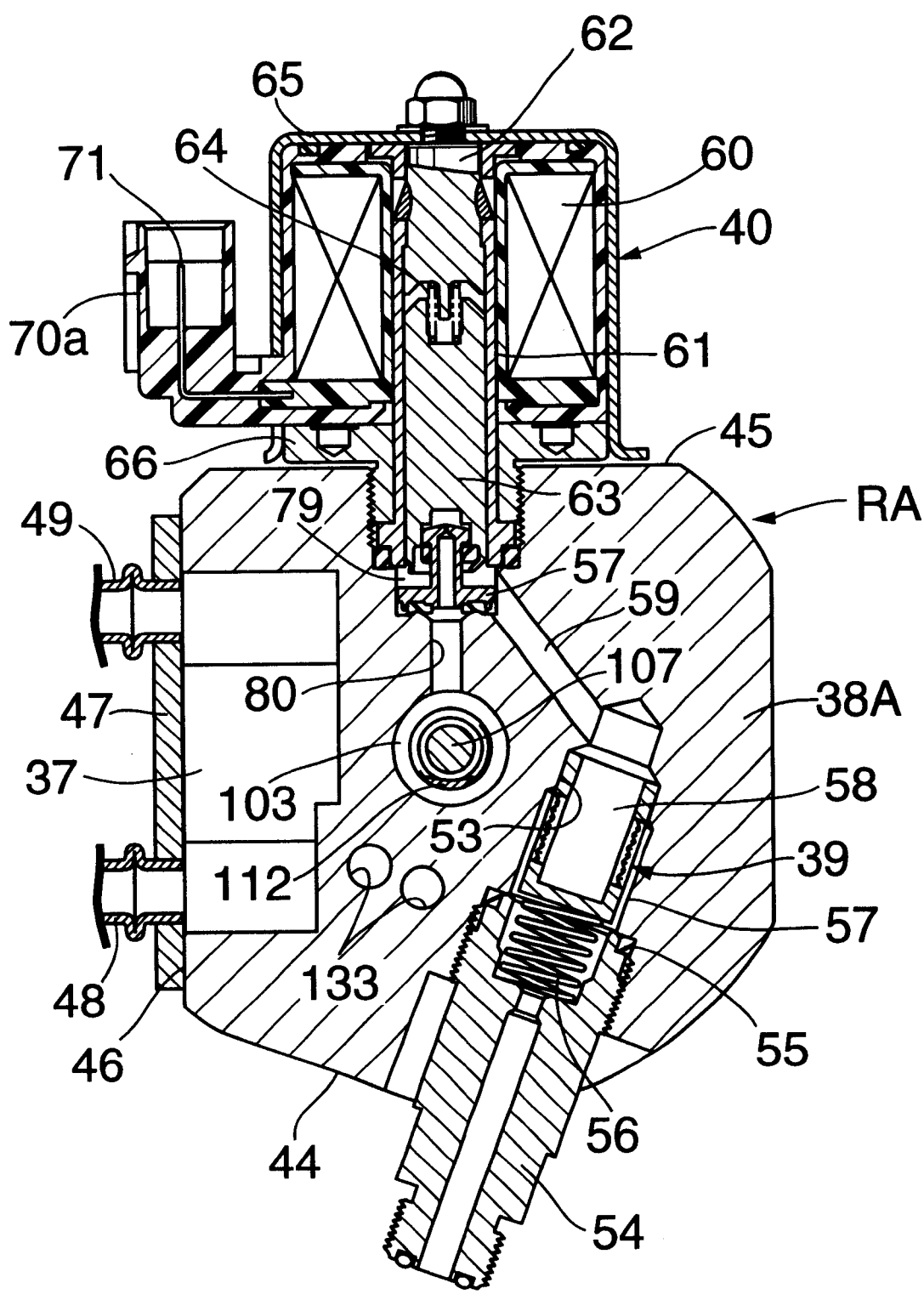

Referring in particular to FIG. 7, a recess 53 is provided in the first side face 44 of the regulator body 38A. A pipe fitting 54 is screwed into the aperture at the outer end of the recess 53 so that an annular seal 55 is interposed between the inner end of the pipe fitting 54 and the regulator body 38A. The high pressure pipeline 28 guiding CNG from the manual cut-off valve 24 is connected to the outer end of the pipe fitting 54. The high pressure filter 39 is fitted in the recess 53 so as to leave a gap between the higher pressure filter 39 and the inner end of the pipe fitting 54. Disposed between the high pressure filter 39 and the pipe fitting 54 is a spring 56 exerting a resilient force that presses the high pressure filter 39 against the closed inner end of the recess 53.

Formed between the regulator body 38A and the outer periphery of the high pressure filter 39 fitted in the recess 53 is an annular unpurified chamber 57 communicating with the interior of the pipe fitting 54. Provided in the regulator body 38A is a passage 59 communicating with a purified chamber 58 within the high pressure filter 39. CNG guided via the high pressure pipeline 28 thus flows from the unpurified chamber 57 into the purified chamber 58 while passing through the high pressure filter 39, and the CNG from which impurities have been removed is guided to the passage 59.

(Solenoid Cut-off Valve 40)

Figure 8:
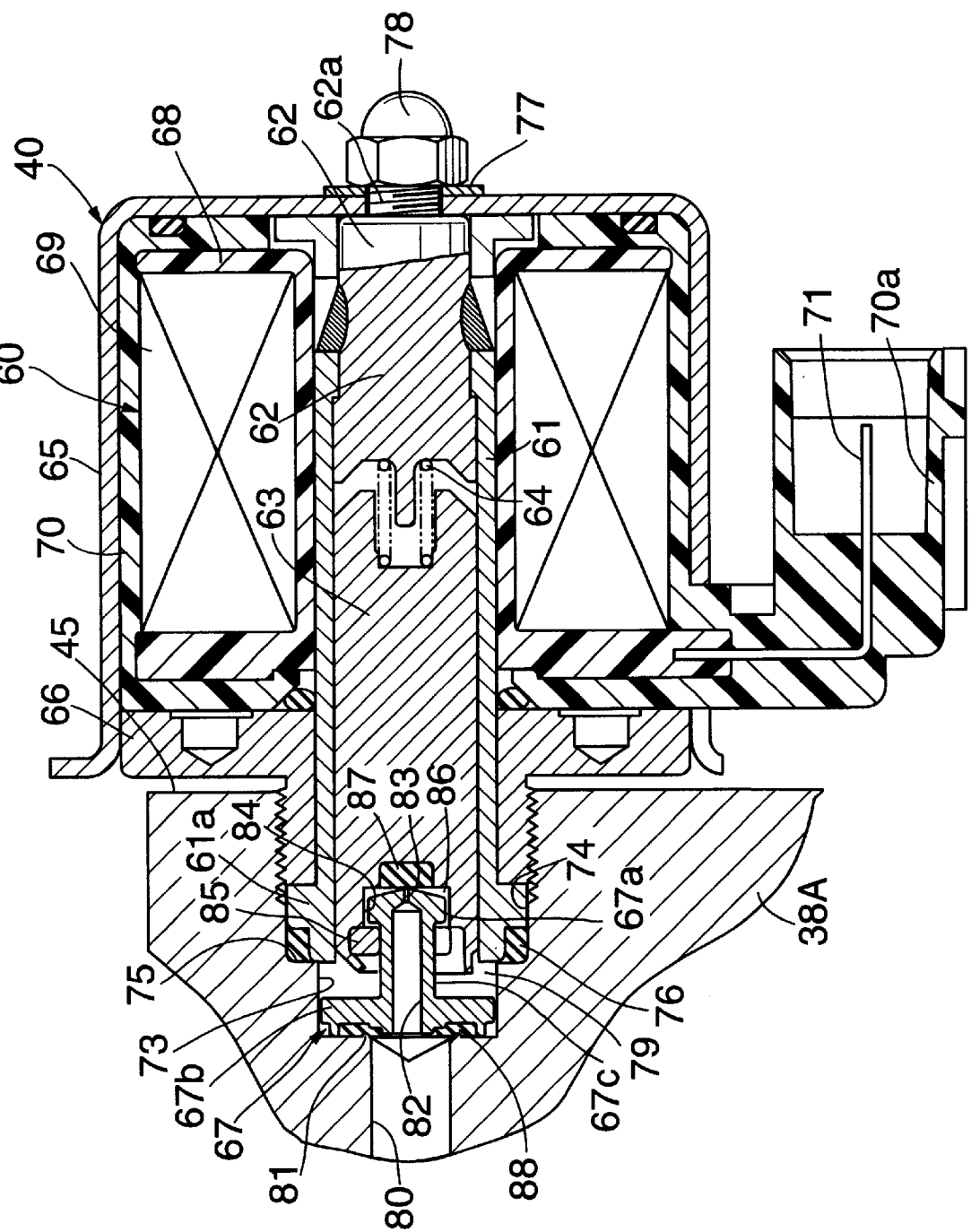

Referring also to FIG. 8, the solenoid cut-off valve 40 is mounted on the second side face 45 of the regulator body 38A at a position opposite the high pressure filter 39.

The solenoid cut-off valve 40 includes a coil assembly 60, a guide tube 61 made of a non-magnetic material, a fixed core 62 fixedly attached to the guide tube 61 so as to block one end thereof, a plunger 63 slidably fitted within the guide tube 61 so as to face the fixed core 62, a return spring 64 disposed between the fixed core 62 and the plunger 63, a solenoid housing 65 made of a magnetic metal, a magnetic support frame 66 screwed into the regulator body 38A so that the coil assembly 60 is interposed between the magnetic support frame 66 and the solenoid housing 65, and a valve member 67 retained by the plunger 63 on the side opposite the fixed core 62. One end of the guide tube 61 is inserted into the coil assembly 60 and the other end is fixed to the regulator body 38A. The solenoid housing 65 is fastened to the fixed core 62 so as to cover the coil assembly 60.

The coil assembly 60 is formed by covering a bobbin 68 made of a synthetic resin and a coil 69 wrapped around the bobbin 68 with a cover 70 made of a synthetic resin. Provided integrally with a part of the cover 70 on the regulator body 38A side so as to project outward is a coupler 70a, a pair of connector terminals 71 connected to the coil 69 extending to the coupler 70a. Leads (not illustrated) are connected to the coupler 70a.

Provided on the second side face 45 of the regulator body 38A are a small-diameter hole 73 with its inner end closed and a large-diameter hole 74 having a larger diameter than that of the small-diameter hole 73 and coaxially connected to the outer end of the small-diameter hole 73, with an annular step 75 disposed therebetween, the step 75 facing outward. One end of the guide tube 61 is inserted into the bobbin 68 and a collar 61a is provided integrally on the outer face of the other end of the guide tube 61 so that the collar 61a protrudes outward in the radial direction and its outer periphery is adjacent to the inner face of the large-diameter hole 74. Said other end of the guide tube 61 is inserted into the large-diameter hole 74 with an annular seal 76 interposed between the collar 61a and the step 75.

The magnetic support frame 66 is mounted on the regulator body 38A by screwing it into the large-diameter hole 74. Moreover, the seal 76 and the collar 61a are interposed between the step 75 and the magnetic support frame 66, thereby fixing the guide tube 61 also to the regulator body 38A.

A threaded shaft 62a is integrally provided so as to be connected to the fixed core 62 while penetrating the central part of the closed end of the solenoid housing 65, which has a bottomed cylindrical form. A cap nut 78 is screwed around a part of the threaded shaft 62a projecting out of the solenoid housing 65 with a washer 77 disposed between the solenoid housing 65 and the cap nut 78. Tightening the cap nut 78 fastens the central part of the closed end of the solenoid housing 65 to the fixed core 62.

Said other end of the guide tube 61 is fixed to the regulator body 38A and is inserted into the large-diameter hole 74. Slidably fitting the plunger 63 in the guide tube 61 forms a main valve chamber 79 between the inner end of the small-diameter hole 73 provided in the regulator body 38A and said other ends of the guide tube 61 and the plunger 63. Moreover, the passage 59 communicating with the purified chamber 58 of the high pressure filter 39 communicates with the main valve chamber 79, and CNG from which impurities have been removed by the high pressure filter 39 is introduced into the main valve chamber 79.

A passage 80 is provided in the regulator body 38A so as to open in the central part of the inner end of the small-diameter hole 73. An annular valve seat 81 is provided on the regulator body 38A so as to surround the open end of the passage 80 in the main valve chamber 79, the valve seat 81 projecting slightly toward the main valve chamber 79 side.

The valve member 67 is formed by integrally providing a pilot valve part 67a on one end side and a main valve part 67b on the other end side via a connecting tube 67c that forms steps between the two valve parts 67a and 67b. The pilot valve 67a is formed in a disc shape having on one end a tapered face whose diameter decreases toward the plunger 63 side. The main valve part 67b is formed in a disc shape that faces the inner end of the small-diameter hole 73. The diameter of the pilot valve part 67a is set so as to be smaller than the diameter of the main valve part 67b. Provided coaxially on the central part of the valve member 67 are a first passage 82 that communicates at all times with the passage 80 and a second passage 83 communicating with the first passage 82 and opening on the central part of said one end face of the pilot valve part 67a, the diameter of the second passage 83 being smaller than that of the first passage 82.

The end of the plunger 63 facing the main valve chamber 79 is provided with a recess 84, into which the pilot valve part 67 is inserted. The pilot valve part 67a is loosely inserted into the recess 84 and prevented from becoming detached from the recess 84 by a C-shaped stopper 85 fixed to the other end of the plunger 63. Formed between the pilot valve part 67a and the plunger 63 is a pilot valve chamber 86 communicating with the main valve chamber 79. A rubber seal 87 is embedded in the central part of the closed end of the recess 84. The rubber seal 87 blocks the aperture of the second passage 83 in the pilot valve chamber 86 when the central part of said one end of the pilot valve part 67a is seated. The stopper 85 is therefore fixed to the plunger 63 at a position where the pilot valve part 67a can move axially relative to the plunger 63 between the closed end of the recess 84 and the stopper 85.

Embedded in the face of the main valve part 67b facing the closed end of the small-diameter hole 73 is an annular rubber seal 88 that blocks communication between the main valve chamber 79 and the passage 80 by sitting on the valve seat 81.

In such a solenoid cut-off valve 40, cutting the power supply to the coil 60 makes the plunger 63 move in a direction away from the fixed core 62 due to the spring force of the return spring 64, the rubber seal 88 of the main valve part 67b is seated on the valve seat 81, blocking communication between the main valve chamber 79 and the passage 80, and the pilot valve part 67a is seated on the rubber seal 87, blocking communication between the pilot valve chamber 86 and the passage 80, thereby suspending supply of high pressure CNG to the passage 80 side.

On the other hand, supplying power to the coil 60 first makes the plunger 63 move sufficiently to the fixed core 62 side to detach the pilot valve part 67a from the rubber seal 87, and the second passage 83 communicating with the passage 80 via the first passage 82 thereby communicates with the pilot valve chamber 86. As a result, CNG gradually flows from the main valve chamber 79 to the passage 80 via the pilot valve chamber 86, the second passage 83 and the first passage 82, and the difference in pressures applied to the main valve part 67b from the main valve chamber 79 side and from the passage 80 side becomes small. When the electromagnetic force due to the coil 60 overcomes the pressure difference acting on the main valve part 67b, the plunger 63 moves further toward the fixed core 62 side, the rubber seal 88 of the main valve part 67b departs from the valve seat 81, and CNG thereby flows from the main valve chamber 79 to the passage 80.

(Primary Pressure-reducing Valve 41)

Figure 9:
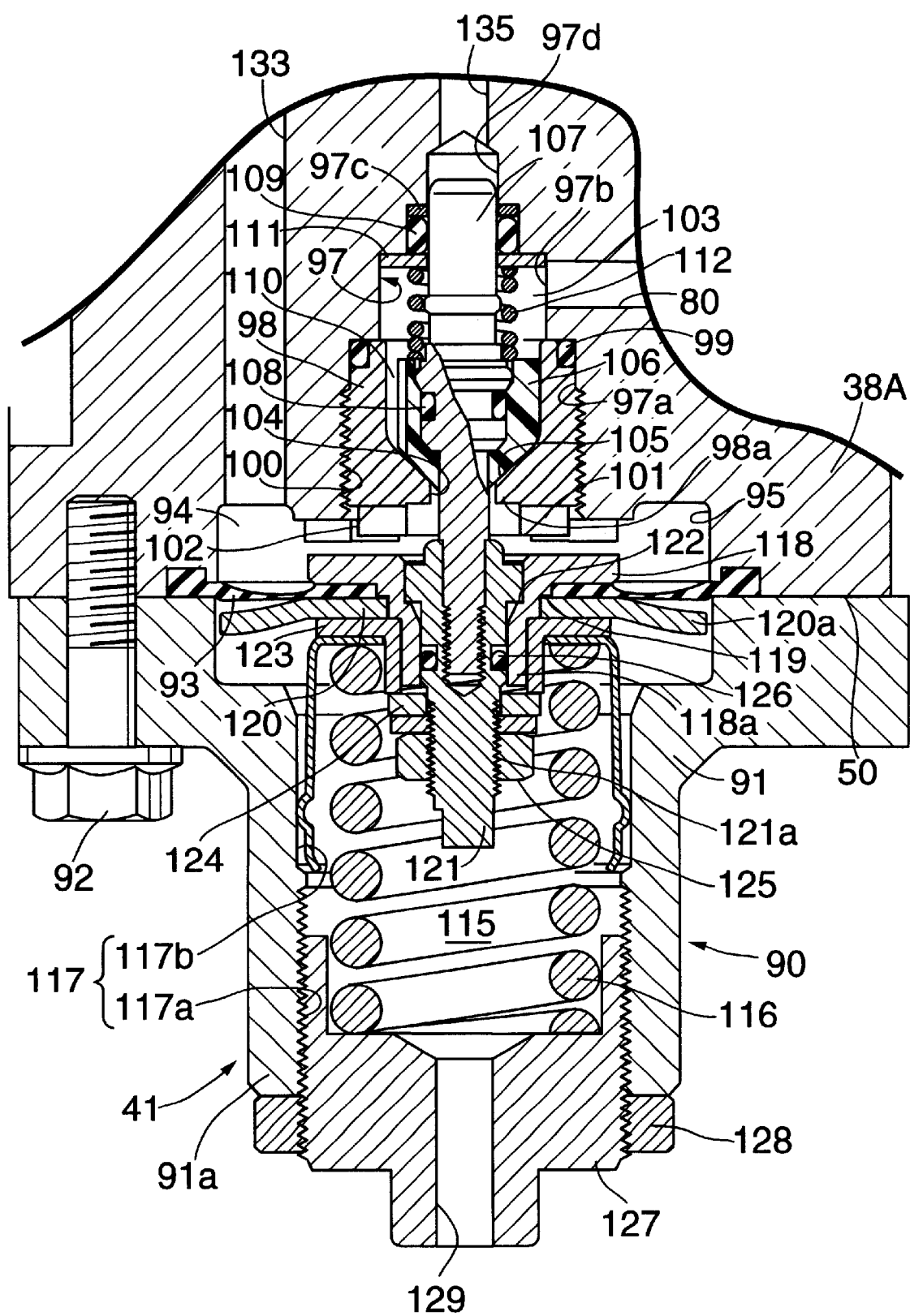

Referring also to FIG. 9, a valve housing 90 of the primary pressure-reducing valve 41 is formed from a part of the regulator body 38A on the first end face 50 side and a cover 91 fastened to the first end face 50 of the regulator body 38A by a plurality of bolts 92. The periphery of a diaphragm 93 is interposed between the first end face 50 of the regulator body 38A and the cover 91 having a cylindrical part 91a.

A pressure-reducing chamber 94 is formed between a recess 95 provided on the first end face 50 and the diaphragm 93. The regulator body 38A is provided with a mounting hole 97 extending toward the second end face 51 side, one end of the mounting hole 97 opening in the central part of the pressure-reducing chamber 94. The mounting hole 97 is formed from a first hole part 97a, a second hole part 97b having a smaller diameter than that of the first hole part 97a, a third hole part 97c having a smaller diameter than that of the second hole part 97b, and a fourth hole part 97d having a smaller diameter than that of the third hole part 97c. One end of the first hole part 97a opens at the central part of the closed end of the recess 95. One end of the second hole part 97b is coaxially connected to the other end of the first hole part 97a. One end of the third hole part 97c is coaxially connected to the other end of the second hole part 97b. One end of the fourth hole part 97d is coaxially connected to the other end of the third hole part 97c. The passage 80 for guiding CNG from the solenoid cut-off valve 40 opens on the inner face of the second hole part 97b.

A cylindrical valve seat member 98 is screwed into the first hole part 97a of the mounting hole 97 so that an annular seal 99 is interposed between the valve seat member 98 and the step formed between the first and second hole parts 97a and 97b. That is to say, a female thread 100 is cut into the inner face at one end of the first hole part 97a in the mounting hole 97, and the valve seat member 98 is screwed into the female thread 100.

Projectingly provided on the end face of the valve seat member 98 on the pressure-reducing chamber 94 side are a plurality of, for example, four projections 102 forming a plurality of, for example, four channels 101 extending in the radial direction of the valve seat member 98 in a plane perpendicular to the axis of the mounting hole 97. These channels 101 are arranged in a cross shape. When the valve seat member 98 is screwed into the female thread 100, the valve seat member 98 can therefore be rotated by engaging a tool (not illustrated) with the channels 101 arranged in the cross shape. The valve seat member 98 can thus be easily fitted into the regulator body 38A.

Formed between the valve seat member 98 and the step formed between the second and third hole parts 97b and 97c in the mounting hole 97 is a valve chamber 103 communicating with the passage 80. The valve seat member 98 is integrally provided, at the end on the pressure-reducing chamber 94 side, with an inward collar 98a protruding inward in the radial direction. A valve hole 104 communicating with the pressure-reducing chamber 94 is formed on the inner periphery of the inward collar 98a. Formed on the inner face of the inward collar 98a is a tapered valve seat 105 facing the valve chamber 103 with the valve hole 104 opening in the central part of the valve seat 105.

Housed within the valve chamber 103 is a valve body 106 made of a synthetic resin, the valve body 106 being able to be seated on the valve seat 105 and being fixed to a valve stem 107 placed coaxially with the valve hole 104.

The valve body 106 is formed in a cylindrical shape having a tapered end facing the tapered valve seat 105 so that the valve body 106 can be seated on the valve seat 105. Resiliently fitting the valve body 106 to the valve stem 107 fixes the valve body 106 to the valve stem 107. Mounted around the outer face of the valve stem 107 is an O-ring 108 that is in resilient contact with the inner face of the valve body 106.

One end of the valve stem 107 is supported in the regulator body 38A in an axially movable manner by an O-ring 109 disposed between the valve stem 107 and the inner face of the third hole 97c of the mounting hole 97. The outer face of the valve body 106 is in sliding contact with the inner face of the valve seat member 98 at a plurality of points that are spaced at equal intervals in the circumferential direction. Flow passages 110 are formed between adjacent sliding contact parts, the flow passages 110 extending along the axial direction of the valve stem 107 between the valve body 106 and the valve seat member 98.

A retaining plate 111 is provided so as to be in contact with the step formed between the second and third holes 97b and 97c. The retaining plate 111 is for retaining the O-ring 109 on the step between the third and fourth holes 97c and 97d of the mounting hole 97. Disposed between the retaining plate 111 and the valve body 106 is a spring 112 exerting a spring force in a direction that seats the valve body 106 on the valve seat 105.

A spring chamber 115 is formed between the cover 91 and the diaphragm 93. Housed in the spring chamber 115 is a coil spring 116 biasing the diaphragm 93 toward the pressure-reducing chamber 94 side.

Provided within the cylindrical part 91a of the cover 91 is a housing hole 117 extending coaxially with the valve hole 104 and having an aperture at its outer end. The housing hole 117 is formed from a threaded hole part 117a that is toward the outside in the axial direction and a slide bore part 117b that is toward the inside in the axial direction, has a larger diameter than that of the threaded hole part 117a and is coaxially connected to the threaded hole part 117a.

The surface of the central part of the diaphragm 93 facing the pressure-reducing chamber 94 side is in contact with a first diaphragm retainer 118 having an integral cylindrical part 118a penetrating the central part of the diaphragm 93 and projecting toward the spring chamber 115 side. The surface of the central part of the diaphragm 93 facing the spring chamber 115 side is in contact with a second diaphragm retainer 120 whose inner periphery is engaged with an annular step 119 provided on the outer face of the cylindrical part 118a, the central part of the diaphragm 93 thereby being interposed between the second diaphragm retainer 120 and the first diaphragm retainer 118.

A diaphragm rod 121 is coaxially joined to the other end of the valve stem 107, that is to say, the end on the diaphragm 93 side. The diaphragm rod 121 is inserted into the central part of the first diaphragm retainer 118 from the pressure-reducing chamber 94 side. Provided on the inner face of the cylindrical part 118a in the first diaphragm retainer 118 is an annular step 122 facing the pressure-reducing chamber 94 side. The diaphragm rod 121 engages with the annular step 122. The second diaphragm retainer 120 is interposed between the diaphragm 93 and an auxiliary retainer 123. A nut 125 is screwed around a threaded shaft part 121a of the diaphragm rod 121 with washers 124 disposed between the nut 125 and the auxiliary retainer 123, the threaded shaft part 121a projecting out of the cylindrical part 118a. Tightening the nut 125 clamps the central part of the diaphragm 93 between the two diaphragm retainers 118 and 120 and also fixes the valve stem 107 to the central part of the diaphragm 93. Moreover, in order to seal the gap between the pressure-reducing chamber 94 and the spring chamber 115, an O-ring 126 is mounted around the outer periphery of the diaphragm rod 121 so as to be in a resilient contact with the inner face of the cylindrical part 118a.

With regard to the diaphragm 93, a part connected to the valve stem 107, that is to say, its central part, and a part interposed between the regulator body 38A and the cover 91, that is to say, its periphery, are comparatively thick, and a part connecting the central part and the periphery is formed into a comparatively thin curved shape. In accordance with the diaphragm 93 having such an arrangement, the pressure resistance of the diaphragm 93 can be increased and its responsiveness at low temperature can be improved.

The second diaphragm retainer 120 is integrally provided on its outer peripheral side with a flexure-restricting part 120a for restricting flexure of the diaphragm 93 toward the spring chamber 115 side. The flexure-restricting part 120a is formed in a curved shape protruding toward the spring chamber 115 side. The outer edge of the flexure-restricting part 120a is positioned so as to face the inner face of the cover 91 at a close distance. The thickness of the part of the diaphragm 93 corresponding to the gap between the outer edge of the flexure-restricting part 120a and the inner periphery of the cover 91 is made greater than the above-mentioned gap.

Since the second diaphragm retainer 120 has the above-mentioned shape, even when a pressure higher than a preset level is applied to the pressure-reducing chamber 94, the diaphragm 93 can be curved smoothly along the second diaphragm retainer 120 toward the inner face of the cover 91, thereby preventing the diaphragm 93 from bending toward the spring chamber 115 at the outer edge of the second diaphragm retainer 120, preventing reduction of the life-span of the diaphragm 93 due to the bending, and increasing the durability of the diaphragm 93.

An adjustment screw 127 is screwed into the aperture at the outer end of the housing hole 117, that is to say, the threaded hole part 117a, in an axially movable manner. A lock nut 128 is screwed around a part of the adjustment screw 127 projecting out of the cover 91, the lock nut 128 regulating the axial position of the adjustment screw 127. The adjustment screw 127 is also provided with an open hole 129 for opening the spring chamber 115 to the air.

The coil spring 116 is provided in compression between the adjustment screw 127 and a leaf spring 132 that is in contact with the auxiliary retainer 123 mounted on the diaphragm 93 on the spring chamber 115 side. Adjusting the axial position of the adjustment screw 127 can thereby adjust the spring load of the coil spring 116.

Figure 10:
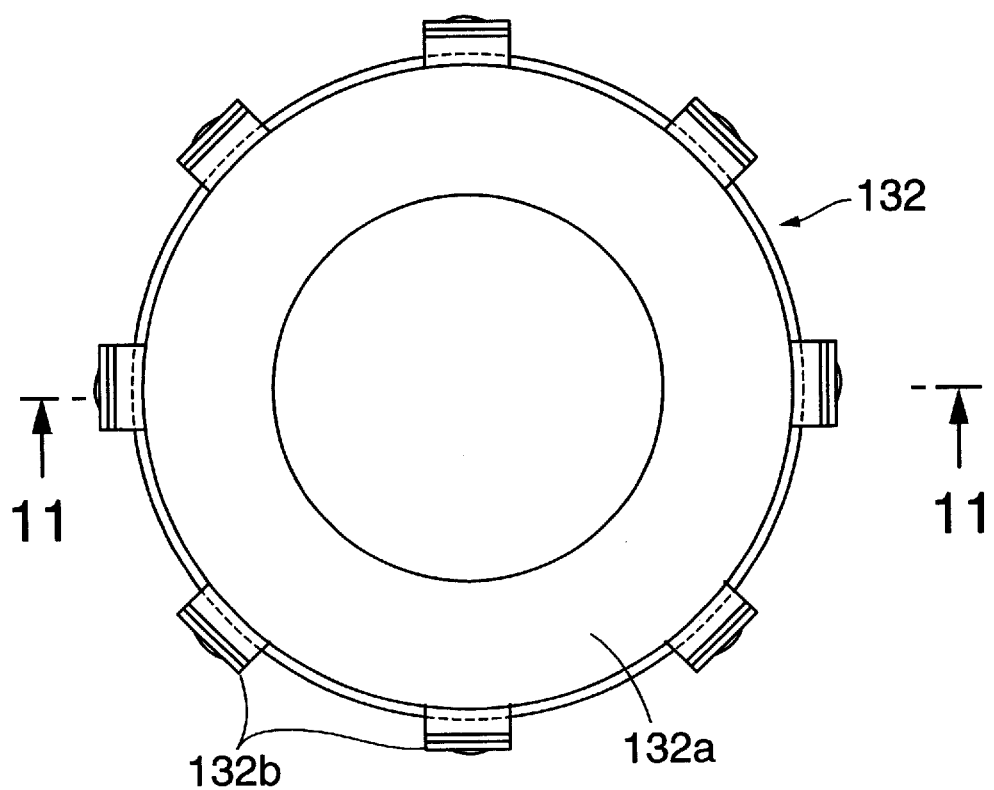
Figure 11:
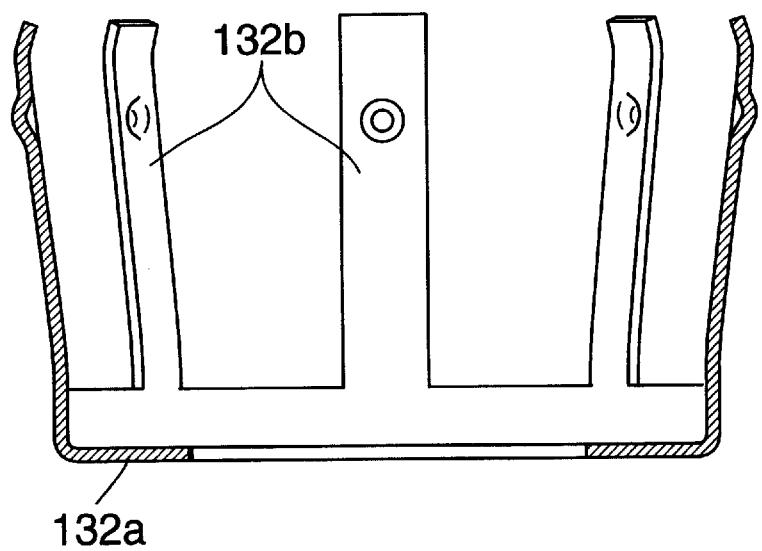
Figure 12:
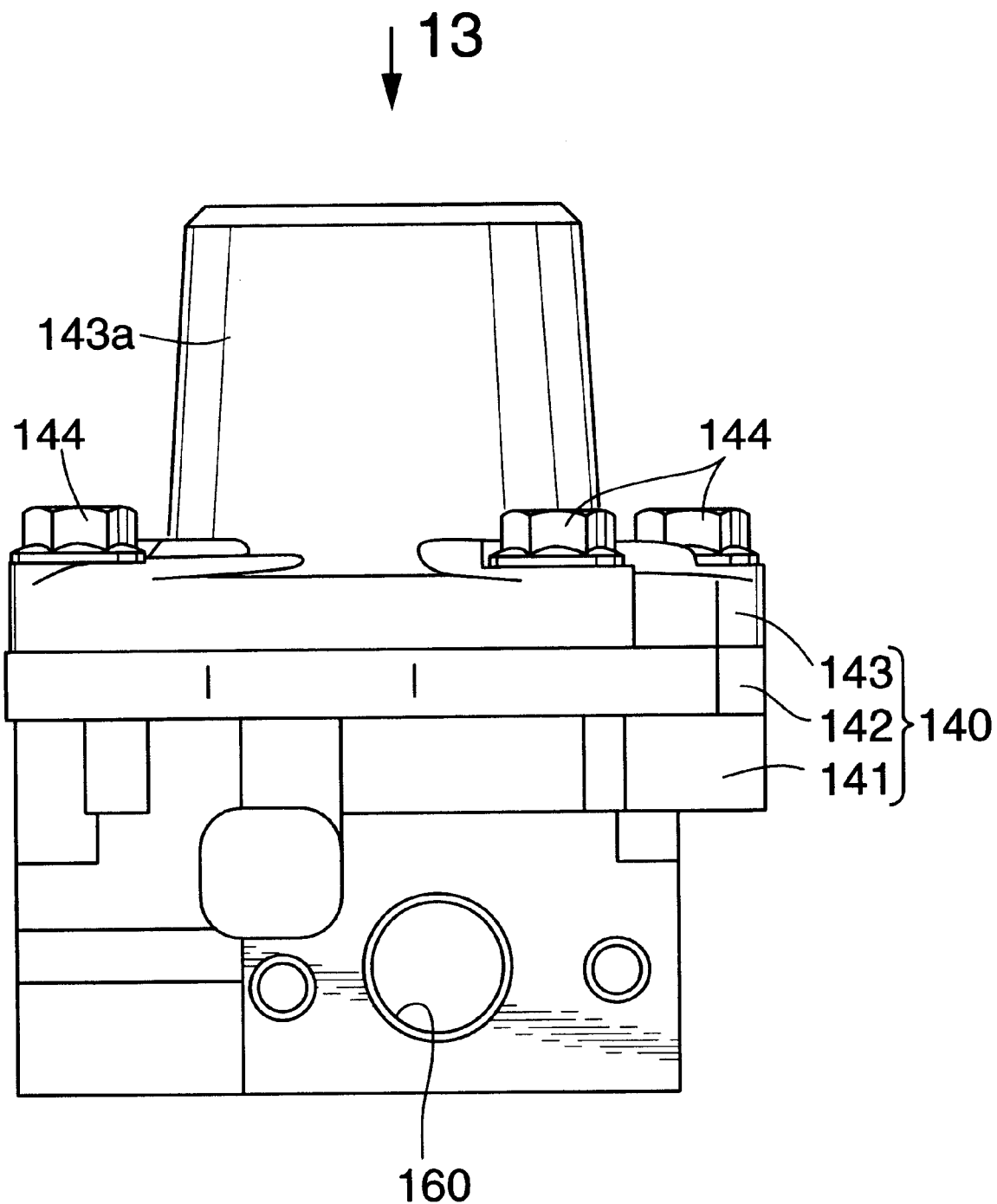
Figure 13:
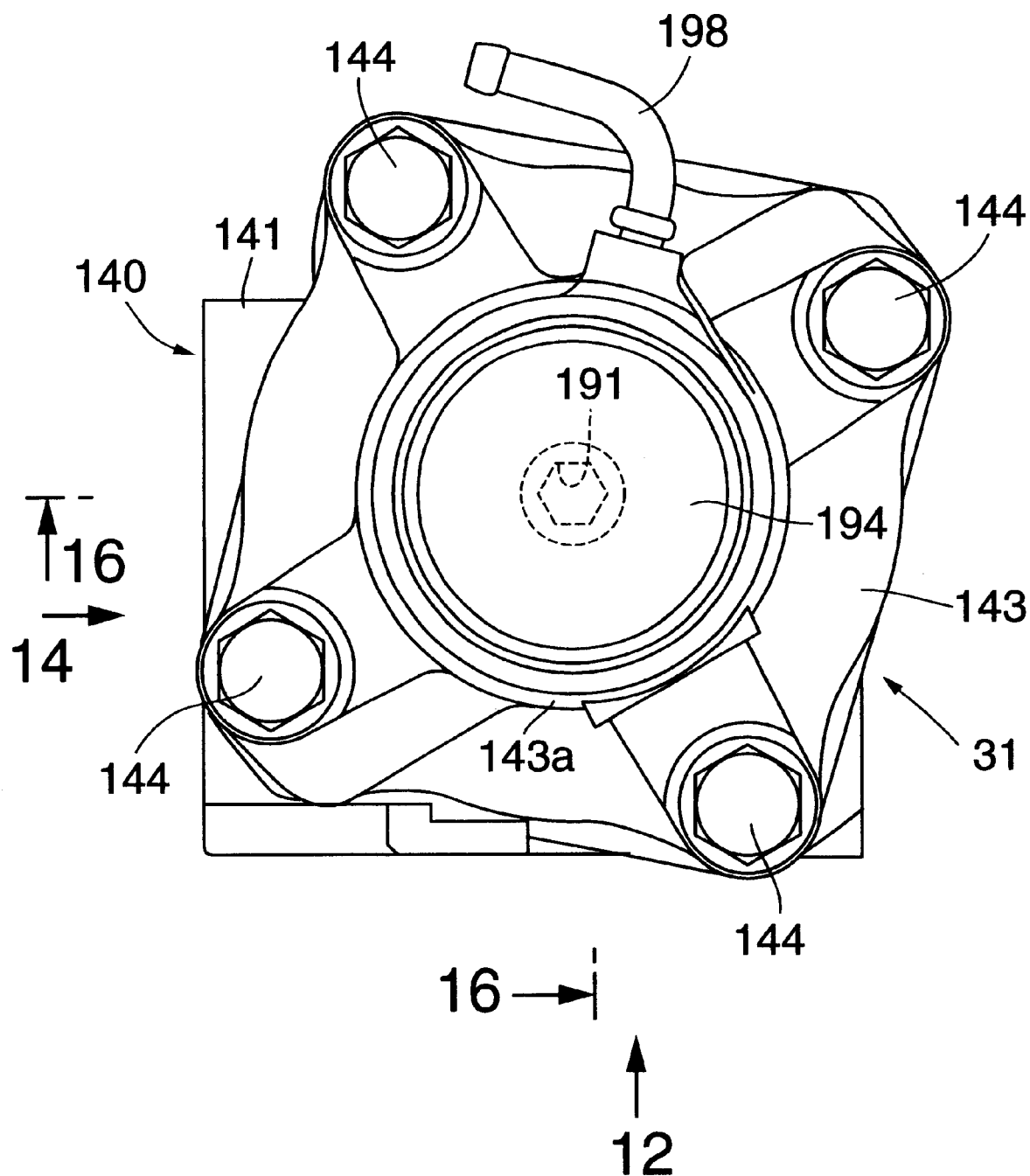
Figure 14:
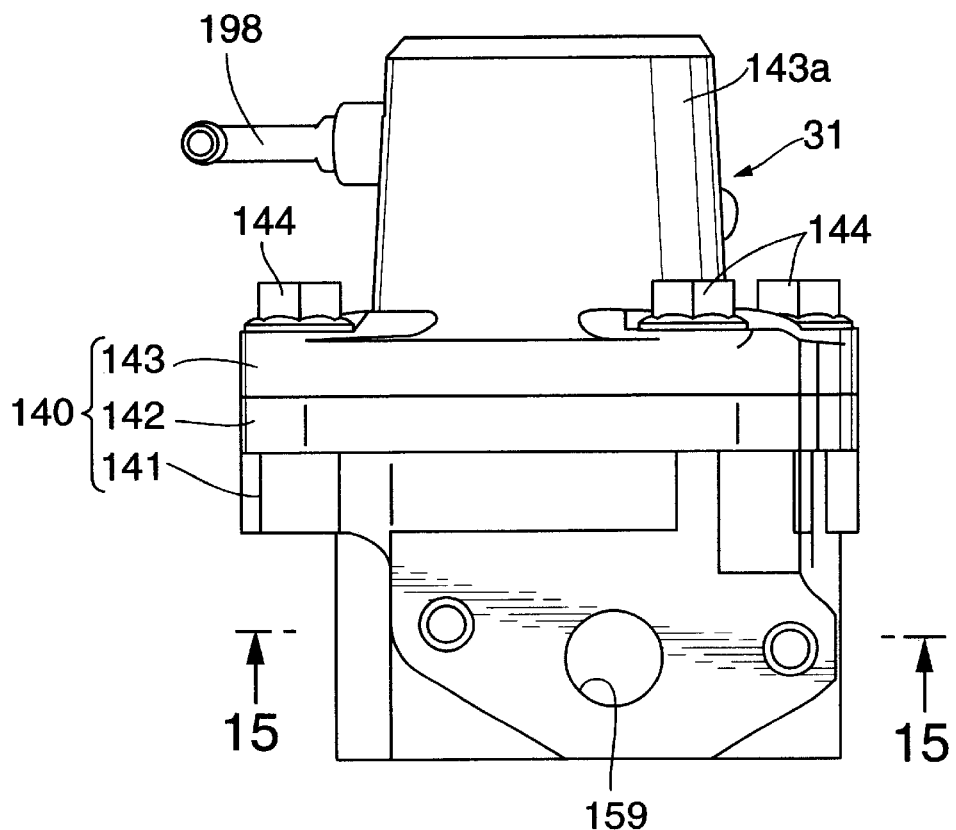
Figure 15:
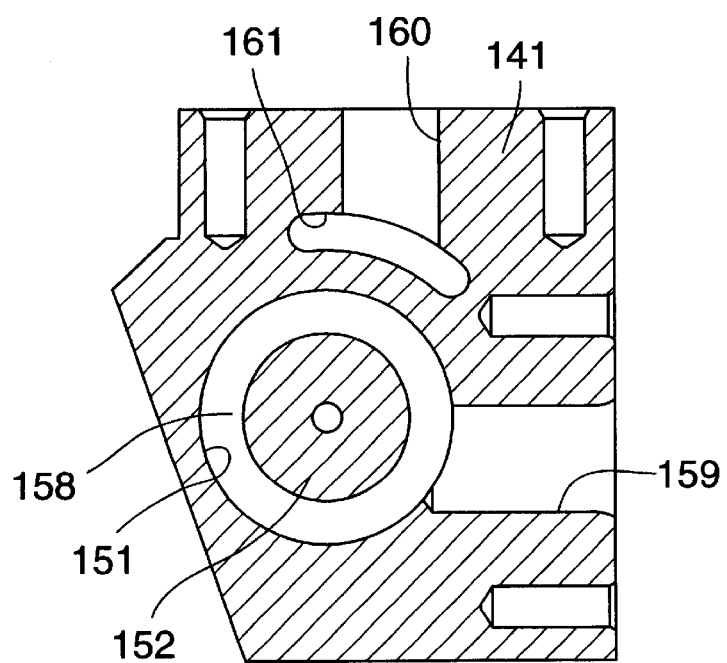
Figure 16:
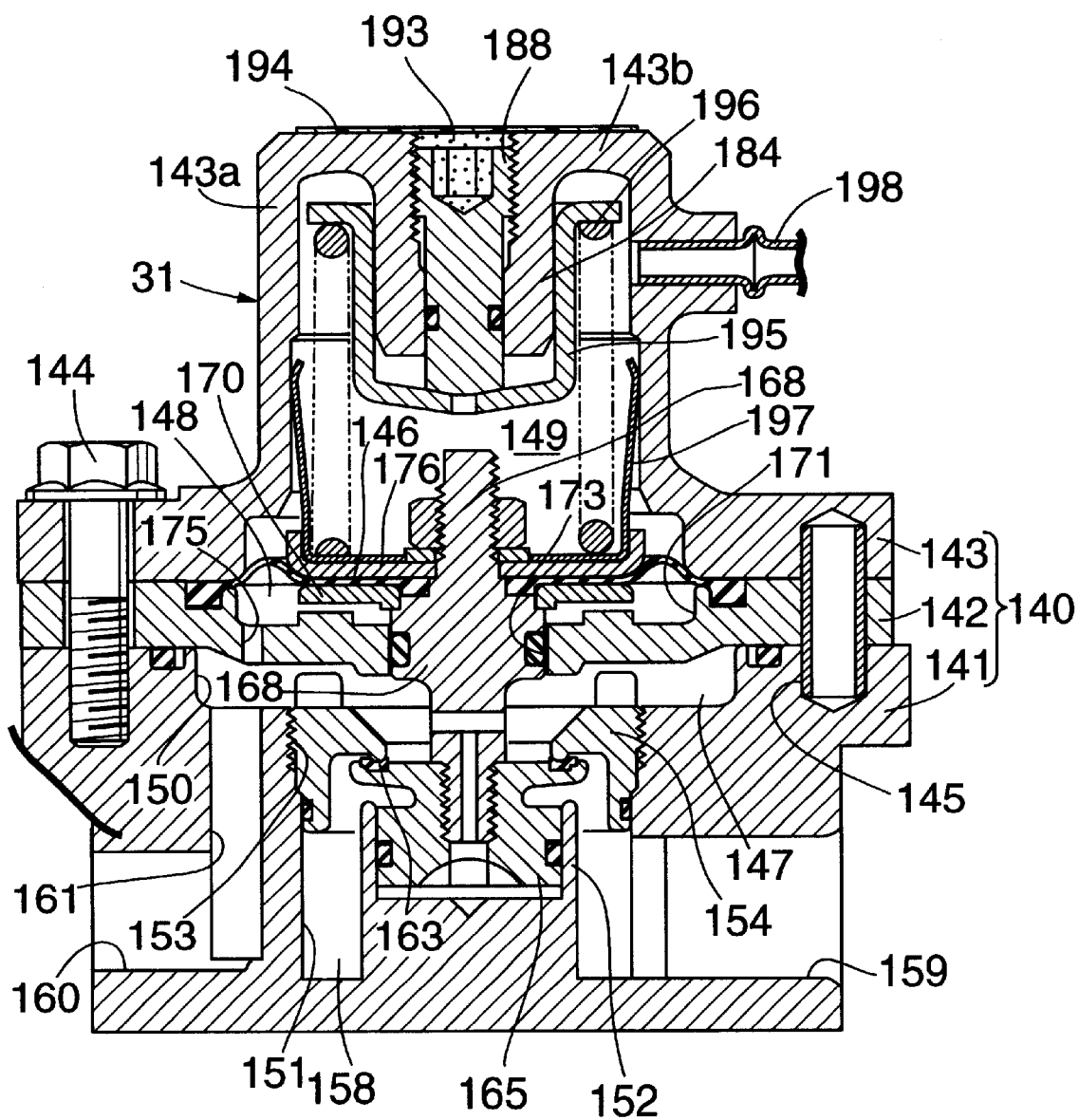

Referring also to FIGS. 10 and 11, the leaf spring 132 is in frictional contact with the inner face of the cylindrical part 91a, which is a part of the valve housing 90, thereby applying a sliding resistance to the diaphragm 93. The leaf spring 132 is formed from a bottomed cylindrical cup 132a and a plurality of leaves 132b connected integrally with the open end of the cup 132a so as to be in resilient sliding contact with the inner face of the slide bore part 117b of the cylindrical part 91a at a plurality of, for example, eight points spaced at equal intervals in the circumferential direction. The closed end of the cup 132a is interposed between the coil spring 116 and the auxiliary retainer 123 mounted on the central part of the diaphragm 93 on the spring chamber 115 side.

A plurality of, for example, two exit passages 133 parallel to the mounting hole 97 are provided in the regulator body 38A, one end of each of the exit passages 133 communicating with the pressure-reducing chamber 94. The other ends of the exit passages 133 open in common in a connecting hole 134 provided in the projection 51a placed on the second end face 51 side of the regulator body 38A.

In the primary pressure-reducing valve 41 having the above-mentioned arrangement, when high pressure CNG does not flow into the valve chamber 103, the diaphragm 93 bends toward the pressure-reducing chamber 94 side due to the spring force of the coil spring 116, and the valve body 106 is detached from the valve seat 105, thereby opening the valve hole 104. When high pressure CNG flows into the valve chamber 103 and further to the pressure-reducing chamber 94 side via the valve hole 104, and the pressure of the pressure-reducing chamber 94 accordingly increases to such a degree that the diaphragm 93 bends toward the spring chamber 115 side against the spring force of the coil spring 116, the valve body 106 becomes seated on the valve seat 105 thereby blocking the valve hole 104. Repeating the above-mentioned opening and blocking of the valve hole 104 reduces the pressure of the CNG that has flowed in the valve chamber 103 at high pressure, for example, 25 to 1 MPa to, for example, 0.6 to 0.7 MPa and supplies it from the pressure-reducing chamber 94 to the exit passages 133.

Figure 6:
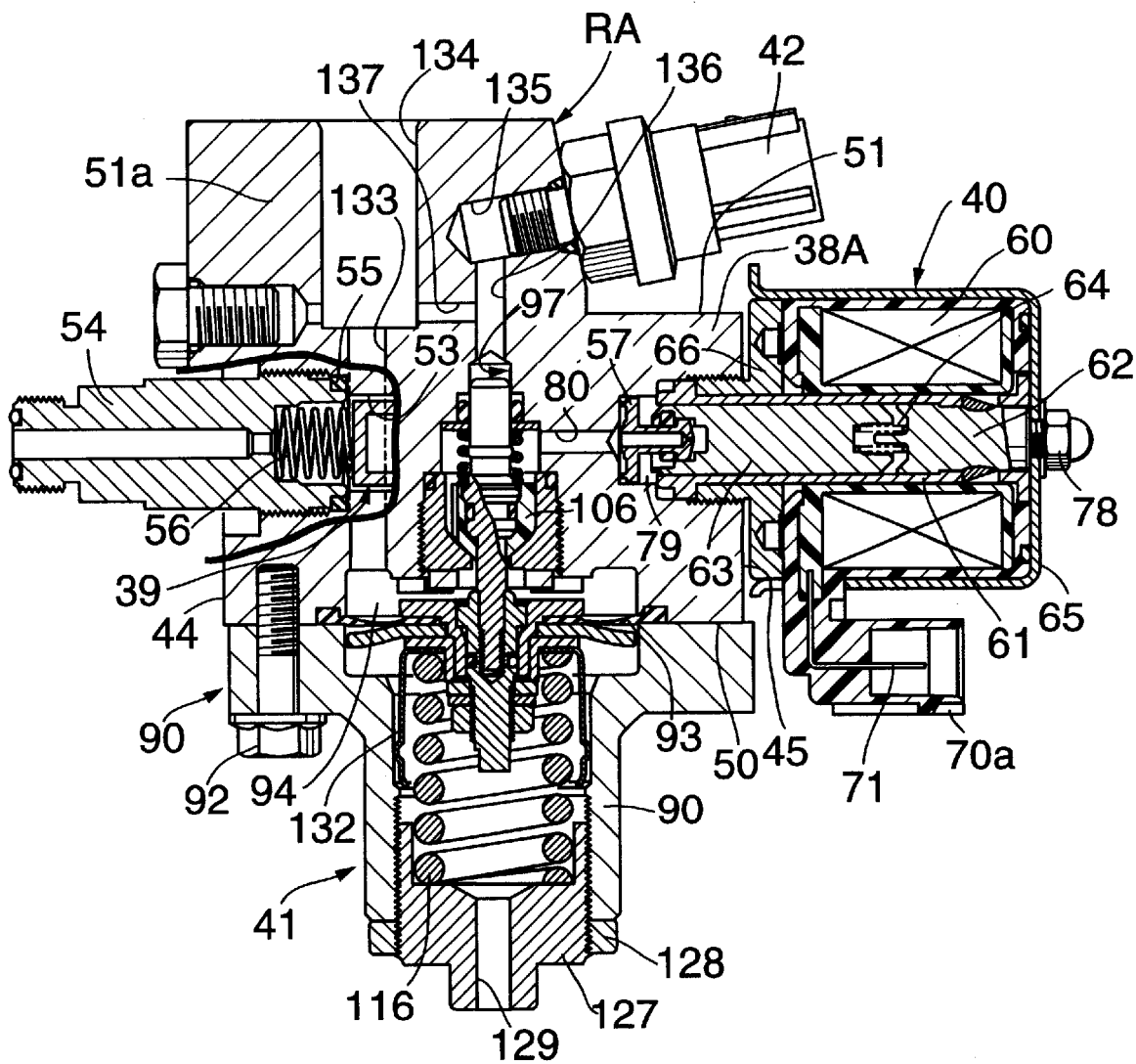

Referring in particular to FIG. 6, a bottomed mounting hole 135 is provided in the projection 51a of the regulator body 38A. The pressure switch 42 is screwed into the mounting hole 135. A detector hole 136 is provided in the regulator body 38A coaxially with the mounting hole 97, the detector hole 136 opening on the inner face of the mounting hole 135 at the closed end side. Also provided in the regulator body 38A is a communicating hole 137 providing communication between the connecting hole 134 and the detector hole 136. The pressure switch 42 changes its switching mode according to whether the pressure of the CNG whose pressure has been reduced by the primary pressure-reducing valve 41 and that is en route from the exit passages 133 to the connecting hole 134 becomes equal to or exceeds, for example, 1.65 MPa.

The secondary pressure-reducing valve 31 is connected to the connecting hole 134 of the regulator RA, and its arrangement is explained below.

(Secondary Pressure-reducing Valve 31)

Referring to FIGS. 12 to 16 together, a valve housing 140 for the secondary pressure-reducing valve 31 is formed by fastening, by means of a plurality of bolts 144, a body 141 to a cover 143 with a partition 142 disposed therebetween. Opposite ends of each of a plurality of dowel pins 145 penetrating the partition 142 are fitted in the body 141 and the cover 143 respectively, thereby positioning the body 141, the partition 142 and the cover 143 relative to each other.

The periphery of the partition 142 is interposed between the body 141 and the cover 143, and the periphery of a diaphragm 146 is interposed between the partition 142 and the cover 143. A pressure-reducing chamber 147 is formed between the body 141 and the partition 142, a pressure action chamber 148 is formed between the partition 142 and one face of the diaphragm 146, the pressure action chamber 148 communicating with the pressure-reducing chamber 147, and a spring chamber 149 is formed between the other face of the diaphragm 146 and the cover 143.

Figure 17:
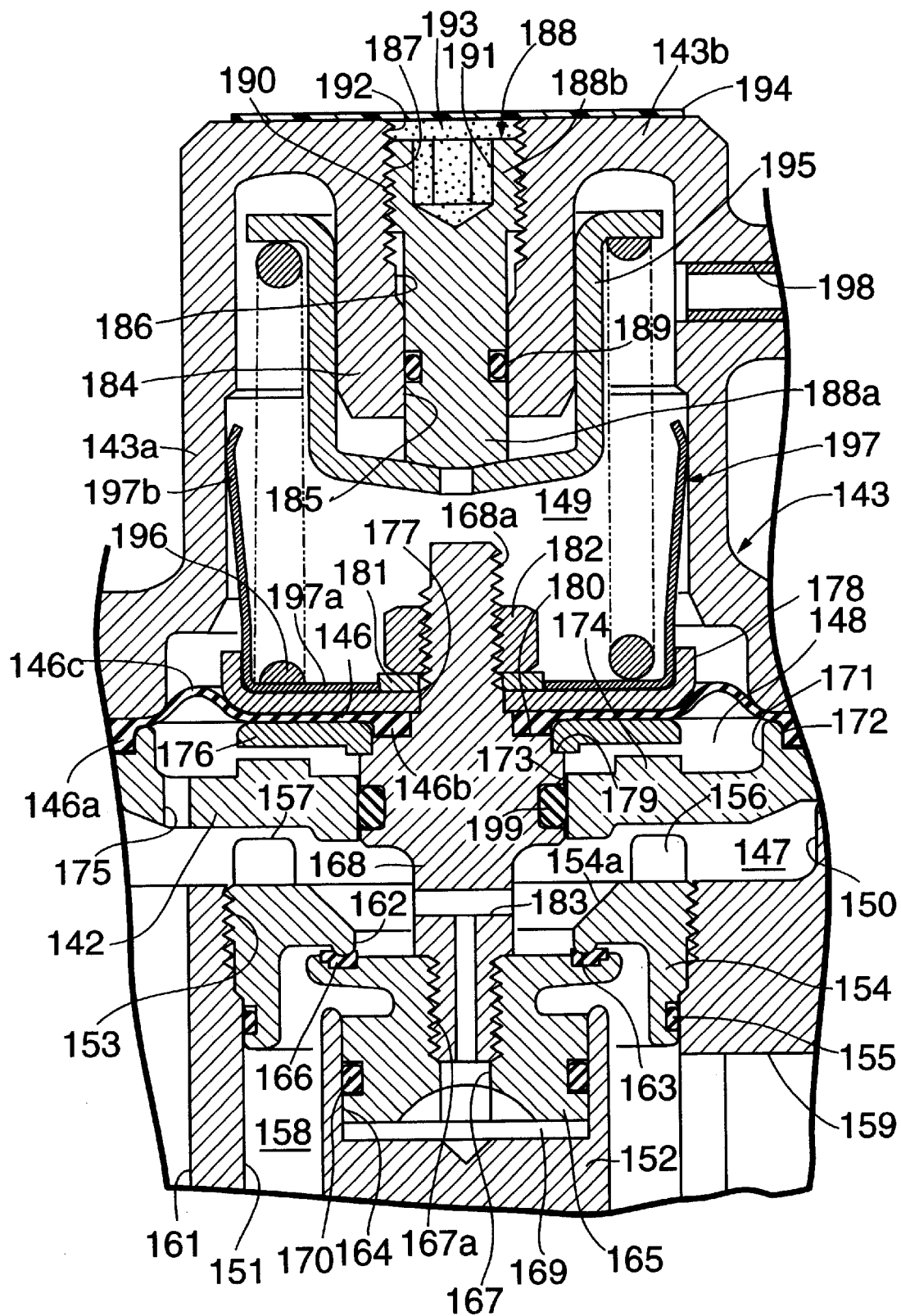

Referring also to FIG. 17, provided on the body 141 are a recess 150 opening so as to face the partition 142 side so that the above-mentioned pressure-reducing chamber 147 is formed between the recess 150 and the partition 142, and a bottomed mounting hole 151, one end thereof opening at the central part of the closed end of the recess 150 and the other end being closed. Moreover, provided at the closed end of the mounting hole 151 is a boss 152 protruding toward the pressure-reducing chamber 147 side.

A female thread 153 is cut into the inner face of the mounting hole 151 on the pressure-reducing chamber 147 side. A cylindrical valve seat member 154 is screwed into the female thread 153. Fitted on the outer face of the valve seat member 154 is an O-ring 155 that is in resilient contact with the inner face of the mounting hole 151.

Projectingly provided on the end face of the valve seat member 154 on the pressure-reducing chamber 147 side are a plurality of, for example, four projections 157. The projections 157 form therebetween a plurality of, for example, four channels 156 extending in the radial direction of the seat valve member 153 in a plane perpendicular to the axis of the mounting hole 151, the channels 156 being arranged in a cross shape. When the valve seat member 154 is screwed into the female thread 153, the valve seat member 154 can therefore be rotated by engaging a tool (not illustrated) with the channels 156 arranged in the cross shape, thereby easily mounting the valve seat member 154 in the body 141.

A valve chamber 158 is formed between the valve seat member 154 and the closed end of the mounting hole 151, the valve chamber 158 communicating with an input port 159 provided in the body 141 so as to open on a side face of the body 141. CNG is introduced from the primary pressure-reducing valve 41 into the input port 159, that is to say, the valve chamber 158.

The body 141 is provided with an output port 160 opening on a side different from that provided with the input port 159, and a passage 161 providing communication between the output port 160 and the pressure-reducing chamber 147. CNG is guided from the pressure-reducing chamber 147 to the gaseous fuel pipeline 36 via the passage 161 and the output port 160.

The valve seat member 154 is integrally provided with an inward collar 154a protruding inward in the radial direction at the end on the pressure-reducing chamber 147 side. A valve hole 162 is formed on the inner periphery of the inward collar 154a so as to communicate with the pressure-reducing chamber 147. Formed on the inner periphery of the inner collar 154a so as to project toward the valve chamber 158 side is an annular valve seat 163 facing the valve chamber 158. The valve hole 162 opens at the central part of the valve seat 163.

Provided on the boss 152 coaxially with the valve hole 162 is a bottomed slide bore 164 opening on the valve hole 162 side. A valve body 165 is slidably fitted in the slide bore 164. Attached to the valve body 165 is an annular rubber seal 166 that can be seated on the valve seat 163.

The valve body 165 is provided with a through hole 167 having a female thread 167a on at least on a part thereof on the pressure-reducing chamber 147 side, the through hole 167 extending between the opposite ends of the valve body 165 in the axial direction. Screwed into the female thread 167a is one end of a valve stem 168 that is coaxial with the valve hole 162. That is to say, the valve body 165 is fixed to said one end of the valve stem 168.

A back pressure chamber 169 is formed between the valve body 165 and the closed end of the slide bore 164. Mounted on the outer face of the valve body 165 is an O-ring 170 that is in resilient sliding contact with the inner face of the slide bore 164.

Figure 18:
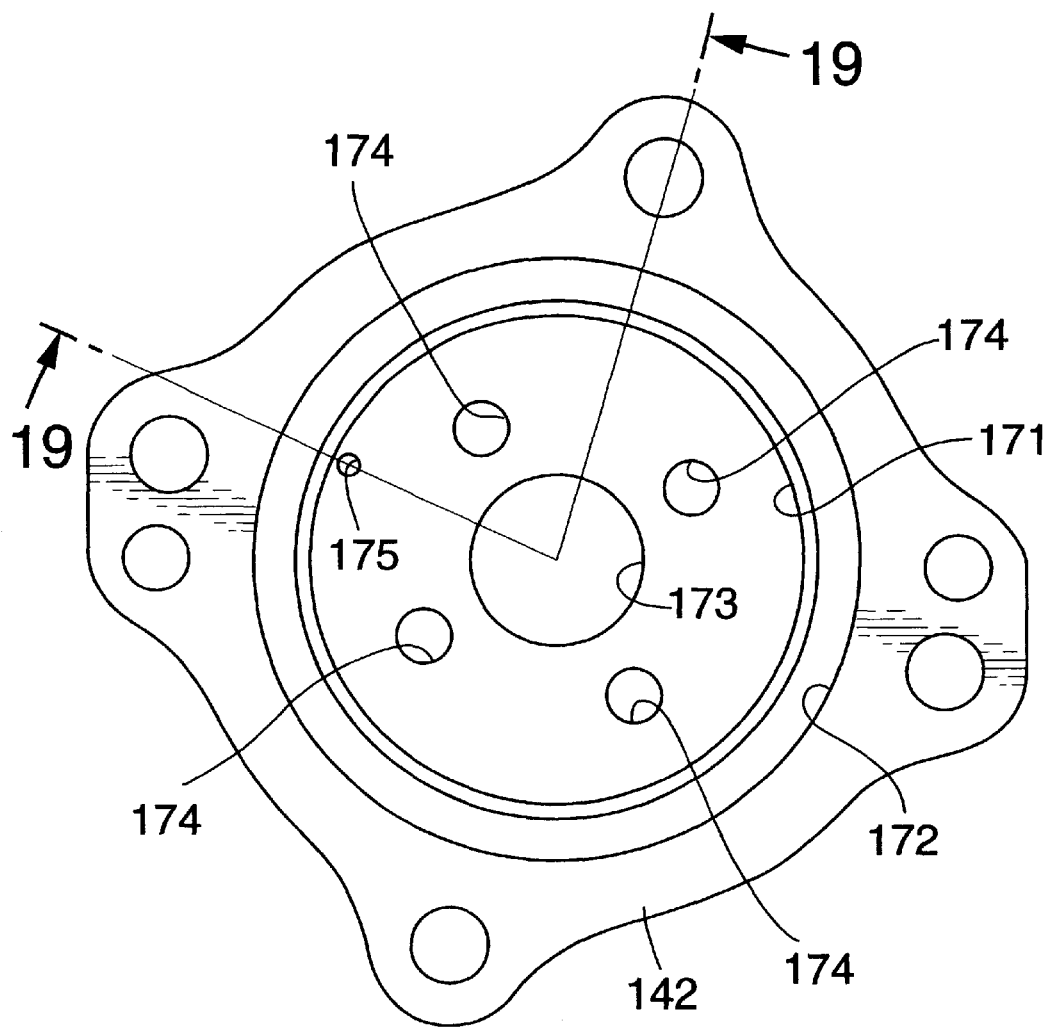
Figure 19:
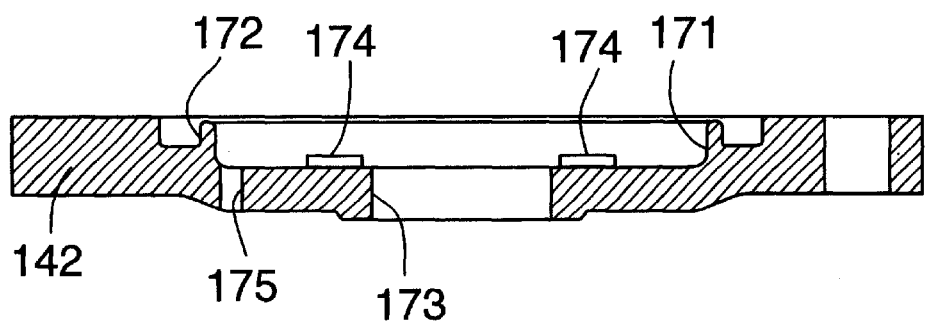

Referring to FIGS. 18 and 19 together, the partition 142 is formed in a dish shape having a circular recess 171 facing the diaphragm 146 side so as to form the pressure action chamber 148 between the partition 142 and the diaphragm 146. An annular channel 172 is provided on the partition 142 so as to surround the recess 171. Fitted in the annular channel 172 is a ring-shaped outer peripheral seal part 146a of the peripheral edge of the diaphragm 146.

Provided in the partition 142 is a through hole 173 allowing the valve stem 168 to penetrate the central part of the partition 142 in an axially movable manner. In addition, a plurality of, for example, four restricting projections 174 are arranged on the partition 142 so as to surround the through hole 173 and project toward the diaphragm 146 side. The restricting projections 174 restrict the stroke limit of the diaphragm 146 in the direction which reduces the volume of the pressure action chamber 148.

Furthermore, formed in the partition 142 is a communicating hole 175 for providing communication between the pressure action chamber 148 and the pressure-reducing chamber 147.

Figure 20:
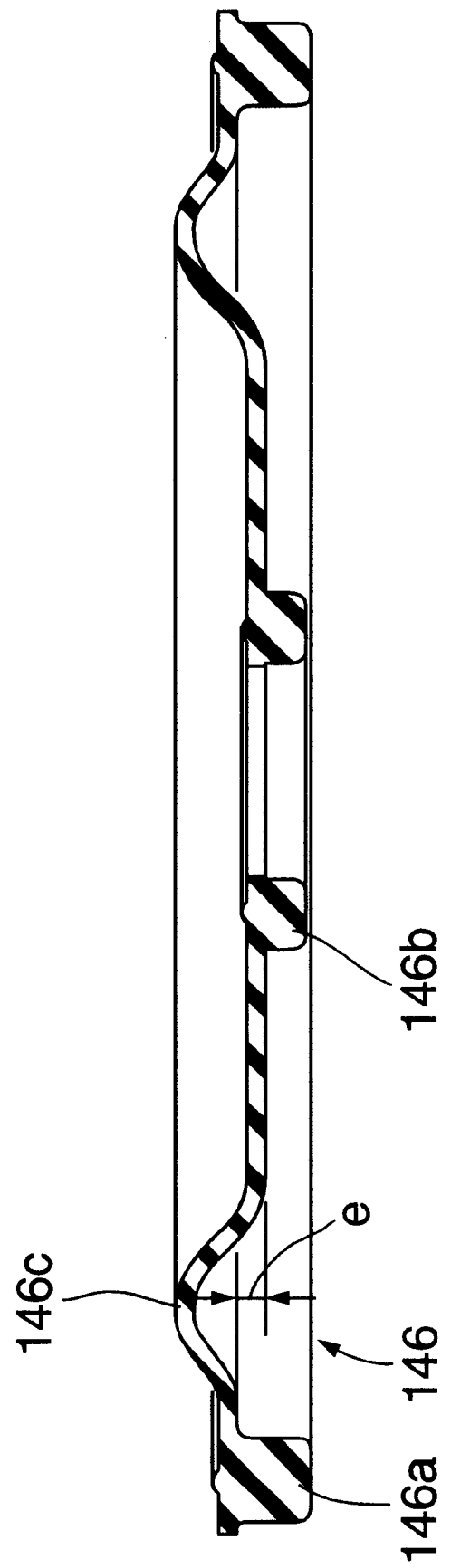

In FIG. 20, the diaphragm 146 is formed integrally from the ring-shaped outer peripheral seal part 146a, a cylindrical valve stem-connecting part 146b and a flexural part 146c having a transverse cross section that protrudes toward the spring chamber 149 side and being disposed inward relative to the outer peripheral seal part 146a. The outer peripheral seal part 146a is fitted in the annular channel 172 of the partition 142 and is interposed between the partition 142 and the cover 143. The cylindrical valve stem-connecting part 146b is disposed in the center for connecting to the valve stem 168. The diaphragm 146 is formed so that, in a natural state where no external force is applied thereto, the inner periphery of the flexural part 146c is offset toward the pressure-reducing chamber 147 side by a predetermined amount e relative to the outer periphery of the flexural part 146c.

A first diaphragm retainer 176 is in contact with the surface of the diaphragm 146 facing the pressure action chamber 148 between the flexural part 146c and the valve stem-connecting part 146b. A second diaphragm retainer 178 having in its central part an insertion hole 177 is in contact with the surface of the diaphragm 146 facing the spring chamber 149 inside the flexural part 146c so that the diaphragm 146 is interposed between the first diaphragm retainer 176 and the second diaphragm retainer 178.

The valve body 165 is fixed to one end of the valve stem 168; the other end of the valve stem 168 coaxially penetrates the valve hole 162 of the valve seat member 154, the through hole 173 of the partition 142, the valve stem-connecting part 146b of the diaphragm 146, and the central parts of the first and second diaphragm retainers 176 and 178 and, extends toward the spring chamber 149 side. The valve stem 168 is provided with an annular step 179 and an annular step 180. The annular step 179 engages with the inner peripheral edge of the first diaphragm retainer 176. The valve stem-connecting part 146b is interposed between the annular step 180 and the second diaphragm retainer 178. Mounted around the outer periphery of the valve stem 168 is an O-ring 199 that is in resilient contact with the inner face of the through hole 173.

Said other end of the valve stem 168 penetrates the valve stem-connecting part 146b of the diaphragm 146 and the insertion hole 177 of the second diaphragm retainer 178, projects into the spring chamber 149 and forms a threaded shaft part 168a. A nut 182 is screwed around the threaded shaft part 168a with a washer 181 disposed between the second diaphragm retainer 178 and the nut 182. Tightening the nut 182 clamps the central part of the diaphragm 146 between the first and second diaphragm retainers 176 and 178, and connects the valve stem 168 to the central part of the diaphragm 146. Moreover, provided on the valve stem 168 is a communicating passage 183 providing communication between the pressure-reducing chamber 149 and the back pressure chamber 169 via the through hole 167 of the valve body 165.

The diaphragm 146 whose central part is clamped between the two diaphragm retainers 176 and 178, the valve stem 168 connected to the central part of the diaphragm 146, and the valve body 165 fixed to the valve stem 168 are assembled to the valve housing 140 so that, when the diaphragm 146 is in its natural state without any external force acting on it, the rubber seal 166 of the valve body 165 is detached from the valve seat 163.

The cover 143 has a cylindrical part 143a provided with an end wall 143b at the end opposite the diaphragm 146. Integrally provided so as to be connected to the central part of the end wall 143b is a support tube 184 arranged coaxially within the cylindrical part 143a and open at both its ends.

The support tube 184 is provided coaxially with a small diameter hole 185 on the axially inner side and a large diameter hole 186 on the axially outer side, a female thread 187 being cut into at least one part of the large diameter hole 186. Screwed into the support tube 184 is an adjustment screw 188 whose axial position can be adjusted. The adjustment screw 188 is formed by coaxially connecting a small diameter shaft part 188a and a large diameter shaft part 188b. The small diameter shaft part 188a is fitted in the small diameter hole 185. Mounted on the outer face of the small diameter shaft part 188a is an annular seal 189 that is in resilient contact with the inner face of the small diameter hole 185. The large diameter shaft part 188b has on its outer periphery a male thread 190 that mates with the female thread 187. Provided on the outer end of the large diameter shaft part 188b is an engagement recess 191 that can engage with a rotating tool. The axial position of the adjustment screw 188 is set so that the inner end of the small diameter shaft part 188a enters the spring chamber 149 and the outer end of the large diameter shaft part 188b is positioned inward relative to the outer face of the end wall 143b.

Setting the axial position of the adjustment screw 188 in this way forms a recess 192 in the outer end part of the large diameter hole 186, the recess 192 employing the outer end of the large diameter shaft part 188b as its closed end. The recess 192 is filled with a filler 193 that can be solidified. Moreover, a seal 194 is bonded to the outer face of the end wall 143b to thereby cover the recess 192.

The female thread 187 with which the adjustment screw 188 mates is cut into the large diameter hole 186 so that at least one part of the female thread 187 faces the recess 192.

A retainer 195 is in contact with and supported on the inner end of the adjustment screw 188 within the spring chamber 149. A coil spring 196 is provided in compression between the retainer 195 and a leaf spring 197 that is in contact with the second diaphragm retainer 178 mounted in the central part of the diaphragm 146 on the spring chamber 149 side. The coil spring 196 biases the diaphragm 146 so that the valve body 165 departs from the valve seat 163. Adjusting the axial position of the adjustment screw 180 can therefore adjust the spring load of the coil spring 196.

Figure 21:
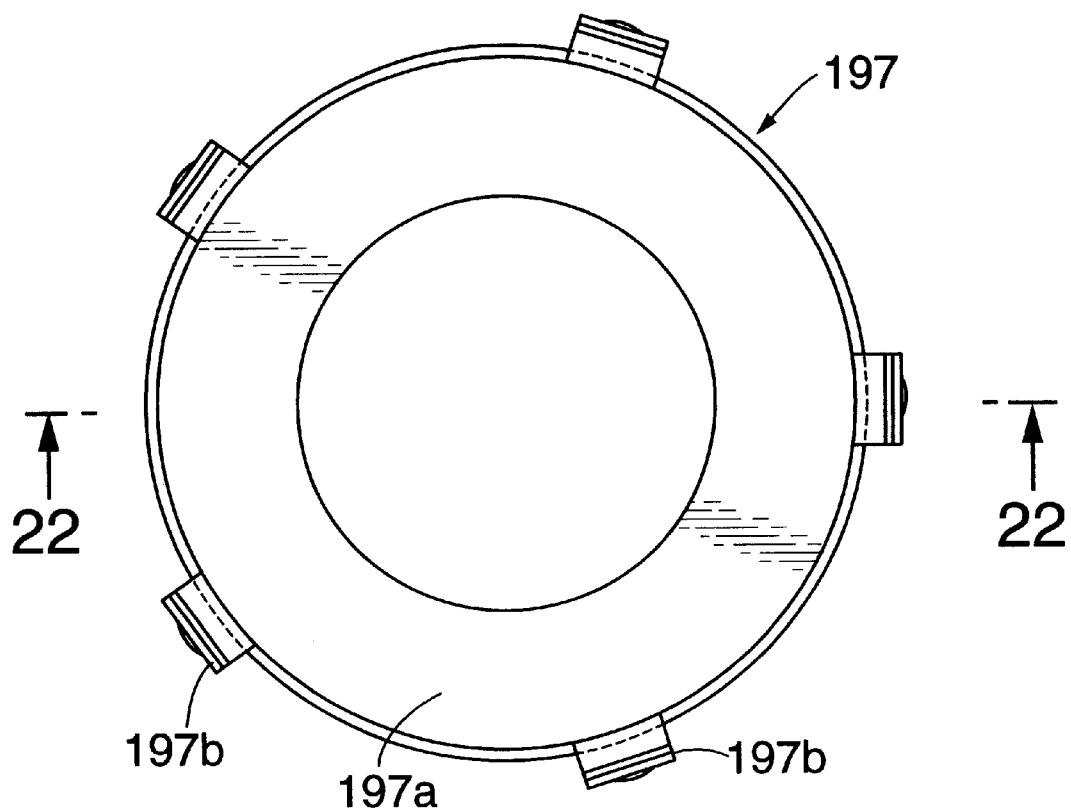
Figure 22:
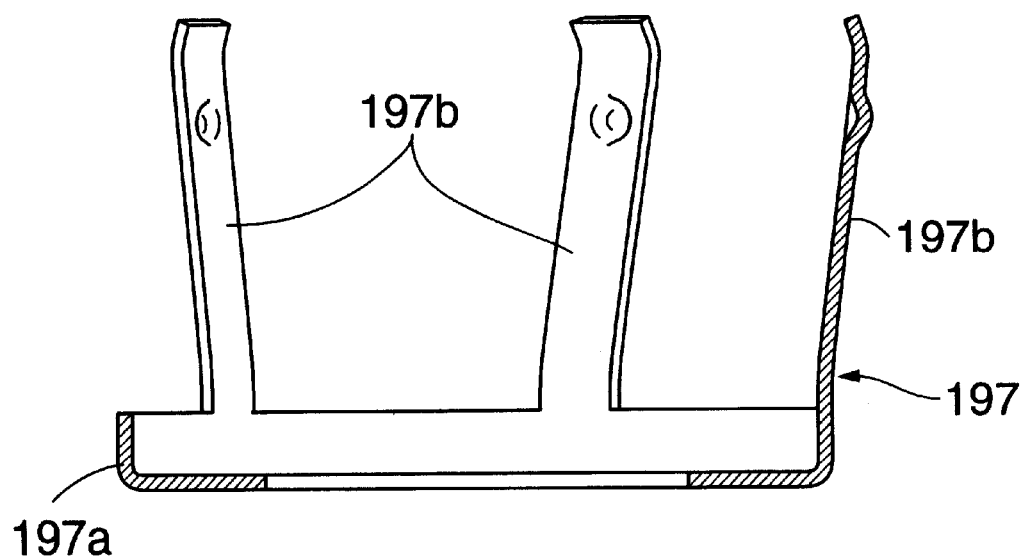

Referring to FIGS. 21 and 22 together, the leaf spring 197 is in frictional contact with the inner face of the cylindrical part 143a, which is a part of the valve housing 140, thereby applying sliding resistance to the diaphragm 146. The leaf spring 197 is formed from a bottomed cylindrical cup 197a and a plurality of leaves 197b integrally connected to the open end of the cup 197a so as to be in resilient sliding contact with a plurality of, for example, five points spaced at equal intervals in the circumferential direction on the inner face of the cylindrical part 143a. The closed end of the cup 197a is interposed between the coil spring 196 and the second diaphragm retainer 178 mounted in the central part of the diaphragm 146 on the spring chamber 149 side.

Furthermore, a connecting tube 198 is connected to the cover 143. The negative intake pressure of the engine E is introduced into the spring chamber 149 via the connecting tube 198 and a pipeline (not illustrated) connected to the connecting tube 198.

In the secondary pressure-reducing valve 31 having the above-mentioned arrangement, when no CNG flows into the valve chamber 158, the diaphragm 146 bends toward the pressure-reducing chamber 147 due to the spring force of the coil spring 196, thereby detaching the valve body 165 from the valve seat 163 so as to open the valve hole 162. When CNG flows into the valve chamber 158, then to the pressure-reducing chamber 147 via the valve hole 162 and further to the pressure action chamber 148, and the difference in pressure between the pressure action chamber 148 and the spring chamber 149 increases to such a degree that the diaphragm 146 bends toward the spring chamber 149 side against the spring force of the coil spring 196, the rubber seal 166 of the valve body 165 becomes seated on the valve seat 163, thereby blocking the valve hole 162. Repeating the above-mentioned opening and blocking of the valve hole 162 reduces the pressure of the CNG that has flowed into the valve chamber 158 at a pressure of, for example, 0.6 to 0.7 MPa to, for example, 0.2 to 0.3 MPa and supplies it from the pressure-reducing chamber 147 to the injectors 32 of the engine E via the output port 160 and the pipeline 33.

The action of the first embodiment is explained below. Among the high pressure filter 39, the solenoid cut-off valve 40, the primary pressure-reducing valve 41, the pressure switch 42, and the secondary pressure-reducing valve 31, which are provided between the CNG tanks 20 and the injectors 32 of the engine E, the high pressure filter 39, the solenoid cut-off valve 40, and the primary pressure-reducing valve 41 are disposed on the common regulator body 38A so as to form the regulator RA, the common regulator body 38A having the passage 59 providing connection between the high pressure filter 39 and the solenoid cut-off valve 40, the passage 80 providing connection between the solenoid cut-off valve 40 and the primary pressure-reducing valve 41, and the exit passages 133 having one end connected to the primary pressure-reducing valve 41, and the pressure switch 42 being attached to the regulator RA.

Forming the regulator RA in this way by integrating on the regulator body 38A the high pressure filter 39, the solenoid cut-off valve 40 and the primary pressure-reducing valve 41, which are on the high pressure side, simplifies the arrangement of the passages in the regulator body 38A in comparison with an arrangement in which the whole of the high pressure section and the low pressure section are integrated to form a regulator, and it becomes correspondingly easier to machine the regulator body 38A. Moreover, the regulator RA can be made compact, thereby reducing restrictions on the layout relative to other components when it is mounted on a vehicle V.

Furthermore, since the valve housing 140 of the secondary pressure-reducing valve 31, which is on the low pressure side, is formed separately from the regulator body 38A, the valve housing 140 of the secondary pressure-reducing valve 31 can be made of a material having comparatively low strength, thereby achieving a reduction in cost.

Furthermore, the primary pressure-reducing valve 41 includes the leaf spring 132 that makes frictional contact with the slide bore part 117b of the cylindrical part 91a, which is a part of the valve housing 90, thereby applying sliding resistance to the diaphragm 93. The secondary pressure-reducing valve 31 includes the leaf spring 197 that makes frictional contact with the inner face of the cylindrical part 143a, which is a part of the valve housing 140, thereby applying sliding resistance to the diaphragm 146.

These leaf springs 132, 197 are formed from the bottomed cylindrical cups 132a, 197a respectively and the pluralities of leaves 132b, 197b formed integrally with the open ends of the cups 132a, 197a so as to be in resilient sliding contact with the inner faces of the cylindrical parts 91a, 143a at a plurality of points spaced at equal intervals in the circumferential direction. The closed ends of the cups 132a, 197a are interposed between the coil springs 116, 119 and the retainers 123, 178 mounted on the central part of the diaphragms 93, 146 on the spring chamber 115, 149 side.

That is to say, the leaf springs 132, 197 apply sliding resistance to the diaphragms 93, 146 against the self-induced vibration of the coil springs 116, 196 as a result of the plurality of leaves 132b, 197b being in resilient sliding contact with the inner faces of the cylindrical parts 91a, 143a. Even when the diameters of the cylindrical parts 91a, 143a decrease as the diameters of the diaphragms 93, 146 decrease, the contact areas between the leaf springs 132, 197 and the cylindrical parts 91a, 143a do not change. The levels of sliding resistance exerted by the leaf springs 132, 197 therefore do not increase as the dimensions of the primary pressure-reducing valve 41 and the secondary pressure-reducing valve 31 reduce. Furthermore, the levels of sliding resistance due to the resilient sliding contact between the leaf springs 132, 197 and the cylindrical parts 91a, 143a do not change as the temperature changes. It is therefore possible to apply a stable sliding resistance against the self-induced vibration of the coil springs 116, 196 regardless of a reduction in the dimensions of the diaphragms 93, 146 and a change in the temperature, thereby preventing any degradation in the responsiveness of the primary pressure-reducing valve 41 and the secondary pressure-reducing valve 31.

Moreover, since the plurality of leaves 132b, 197b are supported by the cups 132a, 197a having a comparatively high rigidity, when assembling the leaf springs 132, 197 to the valve housing 90, 140, breakage, etc. of the leaves 132b, 197b can be avoided, thereby enhancing the ease of assembly.

With regard to the secondary pressure-reducing valve 31, the peripheral edge of the diaphragm 146 is interposed between the cover 143 and the partition 142 that is interposed between the cover 143 and the body 141, the pressure-reducing chamber 147 is formed between the partition 142 and the body 141, and the pressure action chamber 148 is formed between the partition 142 and one surface of the diaphragm 146, the pressure action chamber 148 communicating with the pressure-reducing chamber 147. It is therefore possible to enhance the machining precision by simplifying the structure of a part of the body 141 facing the pressure-reducing chamber 147, and machining the partition 142 can easily be carried out in a state where it is separated from the body 141.

Furthermore, although the diameter of the pressure action chamber 148 changes as the diameter of the diaphragm 146 changes, the diameter of the pressure-reducing chamber 147 disposed between the partition 142 and the pressure action chamber 148 can be determined independently of a change in the diameter of the diaphragm 146. Even when the diameter of the diaphragm 146 is made small in order to answer a need for reducing the dimensions of the secondary pressure-reducing valve 31, it is unnecessary to decrease the diameter of the pressure-reducing chamber 147, thereby avoiding the occurrence of any change in the flow characteristics that would cause the gas pressure of the pressure-reducing chamber 147 to fall below the target control pressure by a large amount.

Moreover, since the gas pressure of the pressure-reducing chamber 147 does not act directly on said one surface of the diaphragm 146, it is possible to prevent an excessive load from being imposed on the diaphragm 146 when the gas pressure of the pressure-reducing chamber 147 changes by a large amount, thereby protecting the diaphragm 146.

Since the body 141 is provided with the slide bore 164 in which the valve body 165 is a sliding fit, the axial movements of the valve body 165 and the valve stem 168 are supported at the two points; on the inner face of the slide bore 164 of the body 141; and on the inner face of the through hole 173 provided on the partition 142, thereby preventing the valve body 165 and the valve stem 168 from tilting and ensuring reliable opening and closing operations of the valve body 165.

In the secondary pressure-reducing valve 31, the diaphragm 146, the valve stem 168 and the valve body 165 are assembled to the valve housing 140 so that, when the diaphragm 146 is in its natural state without any external force acting on it, the rubber seal 166 of the valve body 165 is detached from the valve seat 162. When the diaphragm 146 bends so as to seat the valve body 165 on the valve seat 163 in response to the action of the gas pressure of the pressure action chamber 148 that communicates with the pressure-reducing chamber 147, the diaphragm 146 bends toward the spring chamber 149 side so as to exert a resilient force in the same direction as the direction of the spring force of the coil spring 196, that is to say, opposite to the direction in which the gas pressure of the pressure-reducing chamber 147 closes the valve. When the valve body 165 is detached from the valve seat 163 to a great extent so as to increase the gas flow, the resilient force exerted by the diaphragm 146, against the force of the gas pressure of the pressure-reducing chamber 147 in the direction that closes the valve, becomes small. It is thereby possible to minimize any adverse effect on the responsiveness arising from the resilient force exerted by the diaphragm 146, and even when the gas flow increases the pressure of the pressure-reducing chamber 147 is not controlled at a lower value.

Moreover, the diaphragm 146 is formed integrally from the ring-shaped outer peripheral seal part 146a clamped by the valve housing 140, the valve stem-connecting part 146b connected to the valve stem 168 and the flexural part 146c having a transverse cross section that protrudes toward the spring chamber 149 side and is disposed inward relative to the outer peripheral seal part 146a. The diaphragm 146 is formed so that in its natural state the inner periphery of the flexural part 146c is offset toward the pressure-reducing chamber 147 side by the predetermined amount e relative to the outer periphery of the flexural part 146c. When the diaphragm 146 is assembled to the valve housing 140 in its natural state, the inner periphery of the flexural part 146c of the diaphragm 146, that is to say, the central part to which the valve body 165 is connected via the valve stem 168, is offset toward the pressure-reducing chamber 147 side relative to the external periphery of the flexural part 146c. It is easy to achieve a state in which, when the diaphragm 146 is assembled to the valve housing 140 in its natural state, the valve body 165 is detached from the valve seat 163, thereby making the assembly operation of the diaphragm 146 easy.

Moreover, in the secondary pressure-reducing valve 31, the end wall 143b is provided at the end of the cylindrical part 143a on the side opposite to the diaphragm 146, the cylindrical part 143a forming a part of the valve housing 140. The adjustment screw 188 is screwed into the support tube 184 arranged coaxially within the cylindrical part 143a, which is integrally provided so as to be connected the end wall 143b. The spring load of the coil spring 196 can be adjusted by the axial position of the adjustment screw 188. Merely adjusting the axial position of the adjustment screw 188 by screwing it into the support tube 184 can adjust the spring load of the coil spring 196, thereby reducing the number of components required to adjust the spring load of the coil spring 196 as well as the number of assembly steps.

The support tube 184 is coaxially provided with the small diameter hole 185 on the inward side and the large diameter hole 186 on the outward side. The adjustment screw 188 is fitted into the small diameter hole 185 and has on its tip side the small diameter shaft part 188a on whose outer face is mounted the annular seal 189, which is in resilient contact with the inner face of the small diameter hole 185. It is therefore possible to minimize any damage to the seal 189 due to the female thread 187 provided on the inner face of the large diameter hole 186 when the adjustment screw 188 is inserted into the support tube 184.

Since the adjustment screw 188 is screwed into the support tube 184 until the outer end of the adjustment screw 188 reaches a position that is inward relative to the outer face of the end wall 143b, the adjustment screw 188 does not project out of the outer face of the end wall 143b, thereby contributing to a reduction in the dimensions of the secondary pressure-reducing valve 31.

Furthermore, since the recess 192 is formed in the outer end part of the large diameter hole 186, employs the outer end of the large diameter shaft part 188b of the adjustment screw 188 as its closed end, and is filled with the filler 193, solidifying the filler 193 can gain the effects of preventing the adjustment screw 188 from rotating and of preventing erroneous operation while requiring no lock nut nor cap. In particular, putting the filler 193 into the engagement recess 191 in the outer end part of the adjustment screw 188 can yet more reliably prevent the adjustment screw 188 from rotating.

Moreover, the female thread 187 into which the adjustment screw 188 is screwed is formed in the large diameter hole 186 so that at least one part of the female thread 187 faces the recess 192. The filler 193 filling the recess 192 and entering the threads of the female thread 187 can be reliably retained within the recess 192 and can also efficiently penetrate into the part where the male thread 190 of the adjustment screw 188 and the female thread 187 of the large diameter hole 186 are screwed together, thereby yet more reliably stopping the regulating thread 188 from rotating.

Figure 23:
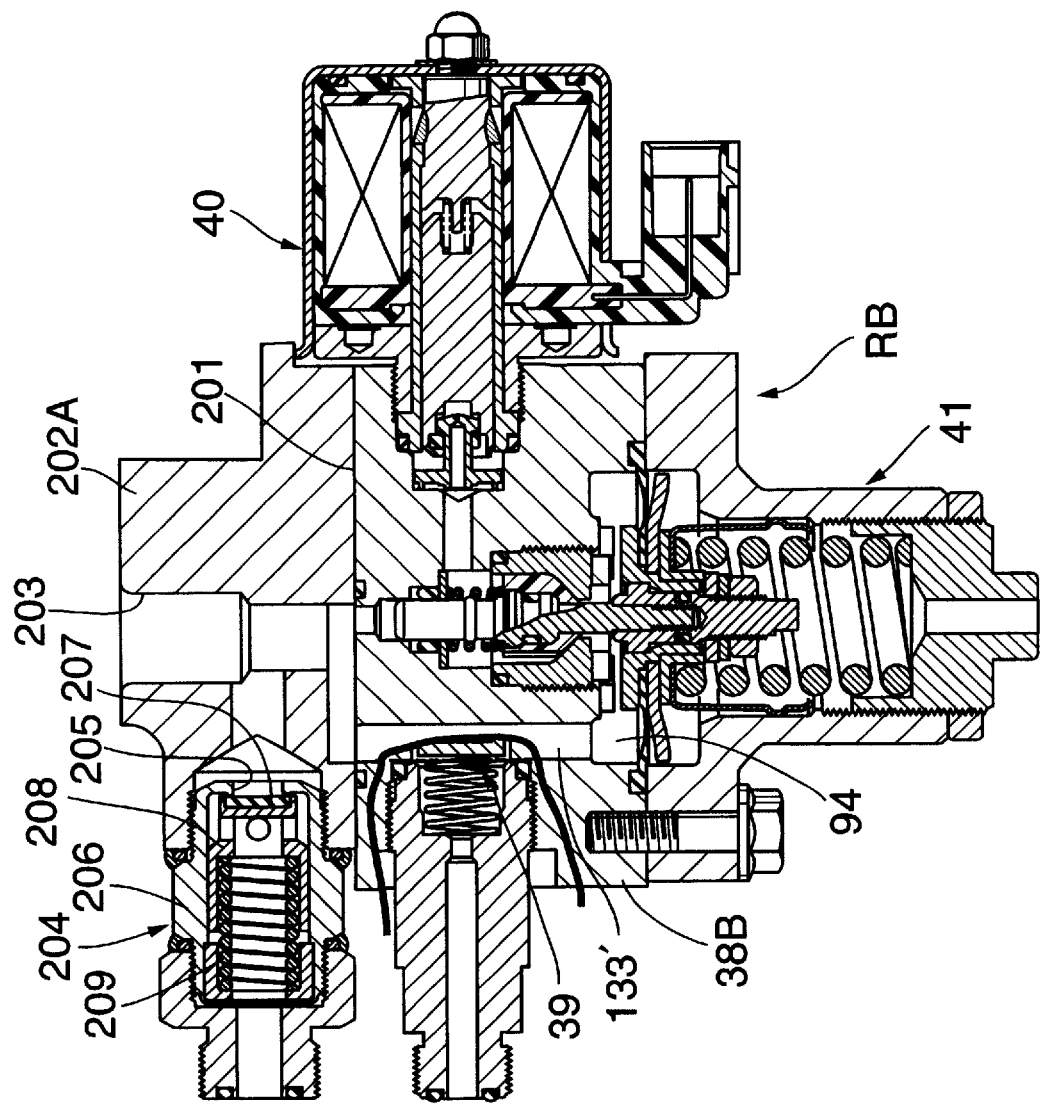
FIGS. 23 and 24 illustrate a second embodiment of the present invention.
Figure 24:
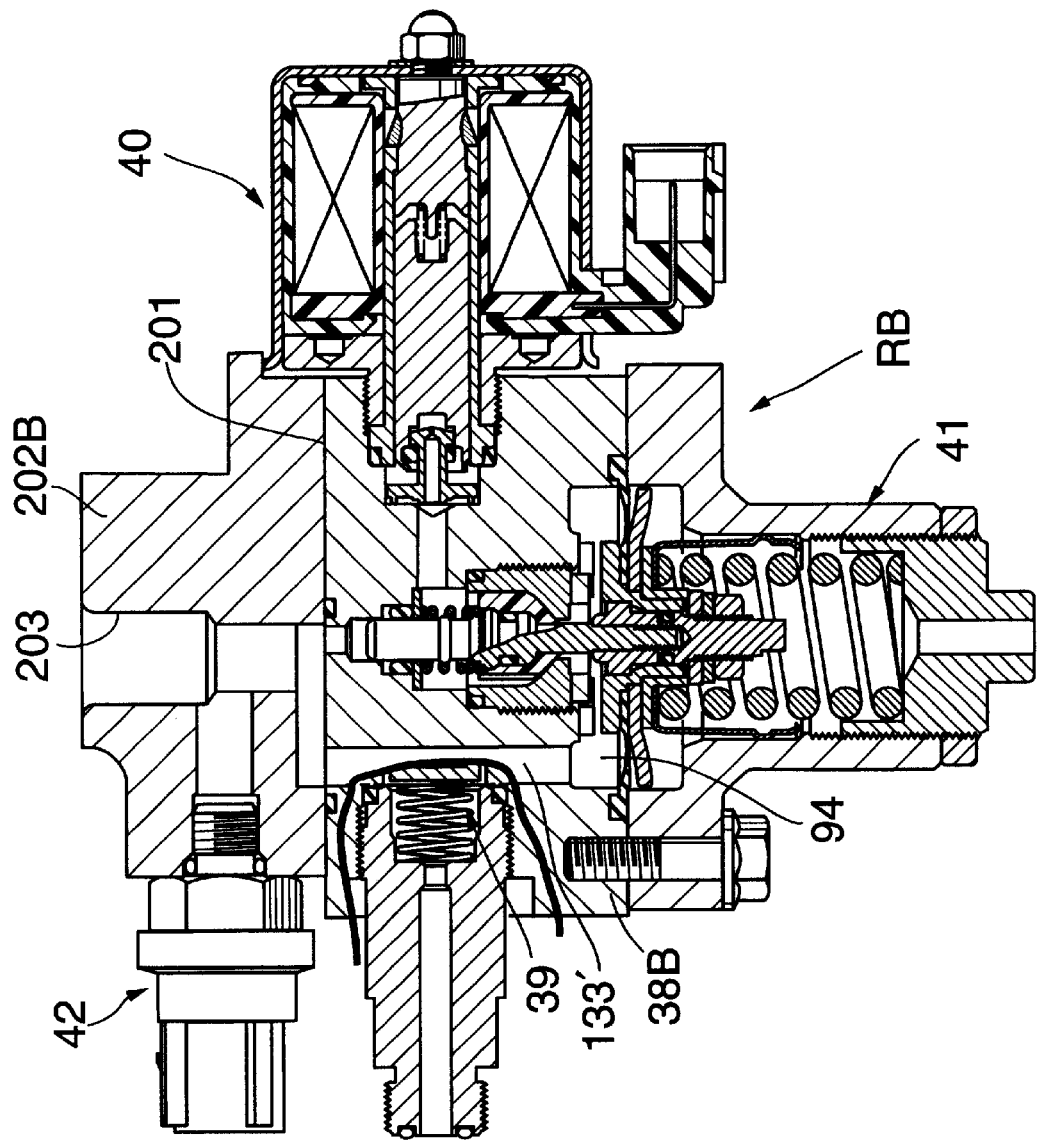

FIGS. 23 and 24 illustrate a second embodiment of the present invention. Parts corresponding to those in the above-mentioned first embodiment are denoted using the same reference numerals and symbols.

A high pressure filter 39, a solenoid cut-off valve 40 and a primary pressure-reducing valve 41 are disposed on a common regulator body 38B to form a regulator RB.

A flat mounting face 201 is formed on an end face of the regulator body 38B on the side opposite to the side where the primary pressure-reducing valve 41 is disposed. Opening on the mounting face 201 is one end of an exit passage 133' provided in the regulator body 38B, the other end of the exit passage 133' communicating with a pressure-reducing chamber 94 of the primary pressure-reducing valve 41.

Selectively mounted in a detachable manner on the mounting face 201 is a body 202A shown in FIG. 23 or a body 202B shown in FIG. 24. The bodies 202A and 202B are each provided with a low pressure passage 203 that communicates with the exit passage 133' when the bodies 202A and 202B are mounted on the mounting face 201.

Mounted on the body 202A shown in FIG. 23 is a relief valve 204, which is safety means of a type different from the pressure switch 42. The relief valve 204 is formed by housing a valve body 208 and a spring 209 within a valve housing 208 that is fixed to the body 202A and that has at its extremity a valve hole 205 communicating with the low pressure passage 203, the valve body 208 having on its forward end a rubber seal 207 capable of blocking the valve hole 205, and the spring 209 spring-biasing the valve body 208 in the direction that blocks the valve hole 205 with the rubber seal 207. The valve housing 206 and the valve body 208 are formed so that CNG flowing from the low pressure passage 203 can be released to the outside when the valve hole 205 is open.

That is to say, the function of the relief valve 204 is to release CNG into the air by opening the valve when the pressure of the low pressure passage 203, that is to say, the output pressure of the primary pressure-reducing valve 41 becomes equal to or exceeds a set pressure determined by the spring 209, for example 1.65 MPa.

Mounted on the body 202B shown in FIG. 24 is a pressure switch 42 that changes its switching mode when the pressure of the low pressure passage 203, that is to say, the output pressure of the primary pressure-reducing valve 41, becomes equal to or exceeds a preset pressure, for example 1.65 MPa, thereby outputting a signal to cut off the solenoid cut-off valve 40.

In accordance with the second embodiment, in order to prevent a high pressure equal to or higher than the set pressure from being imposed on the secondary pressure-reducing valve 31 (ref. the first embodiment), it is possible to freely choose the use of either the relief valve 204 for releasing a part of the CNG output from the primary pressure-reducing valve 41 when the output pressure of the primary pressure-reducing valve 41 becomes equal to or exceeds the set pressure, or the pressure switch 42 for cutting off the solenoid cut-off valve 40 when the output pressure of the primary pressure-reducing valve 41 becomes equal to or exceeds the set pressure. It is thus possible to select either one of the relief valve 204 or the pressure switch 42 and connect it to the regulator RB, thereby enhancing the multi-purpose feature when the gaseous fuel supply system is mounted on a vehicle.

Although embodiments of the present invention have been explained above, the present invention is not limited by the above-mentioned embodiments, and the present invention can be modified in a variety of ways without departing from the spirit and scope of the appended claims.

What is claimed is:

1. A gas pressure-reducing valve comprising:
   a pressure-reducing chamber for generating a gas pressure that acts on one surface of a diaphragm, the pressure-reducing chamber being formed within a valve housing that clamps the peripheral edge of the diaphragm;
   a valve body that can sit on a valve seat having in its central part a valve hole communicating with the pressure-reducing chamber;
   a valve stem penetrating the valve hole in an axially movable manner, wherein one end of the valve stem is connected to the central part of the diaphragm and the other end of the valve stem is fixed to the valve body; and
   a spring biasing the diaphragm in a direction that detaches the valve body from the valve seat, the spring being housed in a spring chamber formed within the valve housing and the spring chamber facing the other surface of the diaphragm;
   wherein the valve housing is formed by conjoining a body, a partition, and a cover, the body being provided with the valve seat, the partition forming the pressure-reducing chamber between itself and the body and forming a pressure action chamber between itself and one surface of the diaphragm, and the cover forming the spring chamber between itself and the other surface of the diaphragm and clamping the peripheral edge of the diaphragm between itself and the partition; and
   wherein the partition has a through hole for allowing the valve stem to run through in an airtight and axially slidable manner and a communicating hole for providing communication between the pressure action chamber and the pressure-reducing chamber.

2. The gas pressure-reducing valve according to claim 1, wherein the body has a slide bore so that the valve body is slidably fitted in the slide bore.

3. The gas pressure-reducing valve according to claim 1, wherein the diaphragm, the valve stem and the valve body are assembled to the valve housing so that, when the diaphragm is in its natural state without any external force acting on it, the valve body is detached from the valve seat.

4. The gas pressure-reducing valve according to claim 3, wherein the diaphragm is formed integrally from a ring-shaped outer peripheral seal part clamped by the valve housing, a valve stem connecting part connected to the valve stem, and a flexural part having a transverse cross section that protrudes toward the spring chamber side and disposed inward relative to the outer peripheral seal part so that, when the diaphragm is in its natural state, the inner periphery of the flexural part is offset toward the pressure-reducing chamber side by a predetermined amount relative to the outer periphery of the flexural part.

5. The gas pressure-reducing valve according to claim 1, further comprising a leaf spring that is in frictional contact with the inner face of a cylindrical part forming a part of the valve housing thereby applying a sliding resistance to the diaphragm, wherein the leaf spring is formed from a bottomed cylindrical cup and a plurality of leaves connected integrally with the open end of the cup so as to be in resilient sliding contact with a plurality of points spaced at equal intervals in the circumferential direction on the cylindrical part, the closed end of the cup being interposed between the spring housed in the spring chamber in a coiled form and a retainer mounted on the central part of the diaphragm on the spring chamber side, and the spring chamber being formed in the cylindrical part.

6. The gas pressure-reducing valve according to claim 1, wherein:
   the spring chamber housing the spring in a coiled form is formed within a cylindrical part forming a part of the valve housing, the cylindrical part being provided with an end wall on the side opposite the diaphragm;
   an adjustment screw is screwed into a support tube arranged coaxially within the cylindrical part and connected to the end wall, the adjustment screw in accordance with its axial position adjusting the spring load of the spring;
   the support tube is provided coaxially with a small diameter hole on the axially inner side and a large diameter hole on the axially outer side, a female thread being cut into at least one part of the large diameter hole;

the adjustment screw is formed by coaxially connecting a small diameter shaft part and a large diameter shaft part, the small diameter shaft part being fitted in the small diameter hole and having mounted on its outer face an annular seal that makes resilient contact with the inner face of the small diameter hole, the large diameter shaft part having on its outer periphery a male thread mating with the female thread and on its outer end an engagement recess that can engage with a rotating tool, and the axial position of the adjustment screw being set so that the outer end of the large diameter shaft part is positioned inward relative to the outer face of the end wall; and a recess is formed in the outer end part of the large diameter hole employing the outer end of the large diameter shaft part as a closed end of the recess, the recess being filled with a filler that can be solidified.

7. The gas pressure-reducing valve according to claim 6, wherein the female thread is cut into the large diameter hole, one part of the female thread facing the recess.

* * * * *